(12) United States Patent
Dalati et al.

(10) Patent No.: US 12,464,231 B2
(45) Date of Patent: Nov. 4, 2025

(54) SYSTEM AND METHOD FOR AUTOMATED CONTROL OF CAMERAS IN A VENUE

(71) Applicant: 1908268 ONTARIO INC., Toronto (CA)

(72) Inventors: Sami Dalati, Toronto (CA); Sepehr Hadizadehmoghaddam, Thornhill (CA)

(73) Assignee: 1908268 ONTARIO INC., Toronto (CA)

( * ) Notice: Subject to any disclaimer, the term of this patent is extended or adjusted under 35 U.S.C. 154(b) by 33 days.

(21) Appl. No.: 18/553,388

(22) PCT Filed: Mar. 29, 2021

(86) PCT No.: PCT/CA2021/050411
§ 371 (c)(1),
(2) Date: Sep. 29, 2023

(87) PCT Pub. No.: WO2022/204778
PCT Pub. Date: Oct. 6, 2022

(65) Prior Publication Data
US 2024/0214674 A1 Jun. 27, 2024

(51) Int. Cl.
*H04N 23/661* (2023.01)
*H04N 7/18* (2006.01)
(Continued)

(52) U.S. Cl.
CPC ......... *H04N 23/661* (2023.01); *H04N 7/181* (2013.01); *H04N 23/695* (2023.01); *H04N 23/90* (2023.01)

(58) Field of Classification Search
CPC .... H04N 23/661; H04N 7/181; H04N 23/695; H04N 23/90; H04N 21/21805; H04N 21/2187; H04N 21/2747; H04N 21/6587
(Continued)

(56) References Cited

U.S. PATENT DOCUMENTS 8,169,492 B2 * 5/2012 Blumenfeld .......... G06F 3/0482
348/211.3
10,121,061 B2 11/2018 Dickinson et al.
(Continued)

FOREIGN PATENT DOCUMENTS

WO 2015120413 A1 8/2015
WO 2019217200 A1 11/2019

OTHER PUBLICATIONS

International Search Report and Written Opinion mailed Dec. 16, 2021 in International Patent Application No. PCT/CA2021/050411 (9 pages).

*Primary Examiner* — Thai Q Tran
*Assistant Examiner* — Stephen R Smith
(74) *Attorney, Agent, or Firm* — SMART & BIGGAR LP; Isis E. Caulder; Sunil R. Rao

(57) ABSTRACT

Various embodiments for a method and system for automated control of cameras in a venue setting are described. Generally, the method comprises: receiving a media capture request, wherein the media capture request comprises a request to capture a media of a target location in the venue; assigning a camera located in the venue to capture the media; accessing a camera-specific venue map associated with the assigned camera, wherein the camera-specific map comprises a mapping of one or more spatial regions in the venue to a corresponding one or more camera motor coordinates; identifying a spatial region, of the one or more spatial regions, that includes the target location; controlling the camera to aim at the target location based on the one or more camera motor coordinates associated with the spatial region; and controlling the camera to capture the media of the target location.

26 Claims, 34 Drawing Sheets

(51) Int. Cl.
*H04N 23/695* (2023.01)
*H04N 23/90* (2023.01)

(58) Field of Classification Search
USPC .................................. 348/159, 143, 153, 36
See application file for complete search history.

(56) References Cited

U.S. PATENT DOCUMENTS

| | | | |
|---|---|---|---|
| 10,931,863 B2* | 2/2021 | Nadeau | H04N 23/633 |
| 11,064,102 B1* | 7/2021 | Helpingstine | H04W 4/022 |
| 11,482,256 B2* | 10/2022 | Qin | G11B 27/10 |
| 2002/0085762 A1 | 7/2002 | Shniberg et al. | |
| 2004/0119819 A1* | 6/2004 | Aggarwal | G08B 13/19641 |
| | | | 348/E7.086 |
| 2007/0279494 A1* | 12/2007 | Aman | H04N 5/262 |
| | | | 348/169 |
| 2008/0087833 A1 | 4/2008 | Mccroskey et al. | |
| 2008/0129825 A1* | 6/2008 | DeAngelis | H04N 23/661 |
| | | | 348/E7.086 |
| 2011/0115930 A1* | 5/2011 | Kulinets | H04N 1/00188 |
| | | | 348/E5.042 |
| 2013/0093897 A1* | 4/2013 | Fan | H04N 21/23424 |
| | | | 348/E7.085 |
| 2013/0194428 A1* | 8/2013 | Chao | G01S 5/16 |
| | | | 348/E7.085 |
| 2014/0078300 A1* | 3/2014 | Tine | G08B 13/196 |
| | | | 348/E5.042 |
| 2014/0150042 A1* | 5/2014 | Pacor | H04N 21/63 |
| | | | 725/116 |
| 2014/0306020 A1* | 10/2014 | Ross | F24F 11/0001 |
| | | | 236/49.3 |
| 2014/0320662 A1 | 10/2014 | Mcnamee et al. | |
| 2015/0062334 A1* | 3/2015 | Dickinson | H04N 7/181 |
| | | | 348/143 |
| 2015/0085131 A1* | 3/2015 | Anderson | H04N 23/62 |
| | | | 348/157 |
| 2015/0347827 A1* | 12/2015 | Dickinson | H04N 21/4788 |
| | | | 382/103 |
| 2016/0205358 A1* | 7/2016 | Dickinson | H04N 7/188 |
| | | | 348/157 |
| 2016/0335484 A1 | 11/2016 | Xie et al. | |
| 2019/0035093 A1* | 1/2019 | Oami | H04N 7/185 |
| 2019/0137597 A1* | 5/2019 | Glover | H04N 23/695 |
| 2020/0302188 A1* | 9/2020 | Iwai | G06T 7/60 |
| 2022/0337907 A1* | 10/2022 | Frusina | H04N 21/2343 |

* cited by examiner

```
"sections": [
    {
        "name": "BRIZI",
        "type": "section",
        "regions": [
            {
                "position": "top_left",
                "row": 1,
                "seat": 0,
                "pan": 0,
                "tilt": 0
            },
            {
                "position": "top_right",
                "row": 1,
                "seat": 0,
                "pan": 0,
                "tilt": 0
            },
            {
                "position": "bottom_left",
                "row": 1,
                "seat": 0,
                "pan": 0,
                "tilt": 0
            },
            {
                "position": "bottom_right",
                "row": 1,
                "seat": 0,
                "pan": 0,
                "tilt": 0
            },
            "zoom_factor": 0.7000000000000001,
            "angle": 0.0
```

```
"camera": 1,
"event_url": "test.brizi.co",
"put": {
    "model": "PTU-5",
    "deg": {
        "pan": 0.005,
        "tilt": 0.005
    }
},
"operations": 2,
"section_count": 10,
"ref_point": {
    "pan": -218,
    "tilt": -544
}
```

FIG. 5I

| Parsed Mapping Info | | | |
|---|---|---|---|
| Cameras | Cam1 | Cam2 | Total |
| Number of Sections | 12 | 2 | 14 |
| Number of Boxes | 0 | 1 | 1 |
| Number of Suites | 36 | 1 | 37 |
| Number of Custom Type 1 | 0 | 0 | 0 |
| Number of Custom Type 2 | 0 | 0 | 0 |
| Number of Custom Type 3 | 0 | 0 | 0 |
| Number of Regions | 48 | 4 | 52 |
| Number of Seats | 401 | 427 | 828 |
| Reference Pan | -353 | 0 | |
| Reference Tilt | -1,281 | 0 | |
| Max Zoom | 0.35 | 0.22 | |
| Avg Zoom | 0.028 | 0.17 | |
| Min Zoom | 0 | 0.12 | |
| Max Angle | 16 | 1.5 | |
| Avg Angle | -2,505 | -1,125 | |
| Min Angle | -20 | -4 | |
| Max Pan | -3,752 | -3,070 | |
| Min Pan | 4,663 | 2,793 | |
| Max Tilt | -6,453 | -2,092 | |
| Min Tilt | -4,415 | 800 | |

502m → Parsed Mapping File

| Cameras | Seat Type | Section | Min Row | Max Row | Min Seat | Max Seat |
|---|---|---|---|---|---|---|
| Enter Cam ↑↓ Q | Enter Seat ↑↓ Q | Enter Sector Q | Enter Min R Q | Enter Max R Q | Enter Min S Q | Enter Max S Q |
| cam1 | section | 4 | E | J | 1 | 4 |
| cam1 | section | 4 | E | H | 5 | 8 |
| cam1 | section | 5 | E | H | 1 | 4 |
| cam1 | section | 5 | E | H | 5 | 8 |
| cam1 | section | 6 | E | H | 5 | 8 |
| cam1 | section | 6 | E | J | 1 | 4 |
| cam1 | section | 7 | J | H | 5 | 8 |
| cam1 | section | 7 | H | G | 1 | 3 |
| cam1 | section | 7 | G | G | 12 | 13 |
| cam1 | section | 7 | G | F | 1 | 2 |
| cam1 | section | 7 | F | F | 7 | 7 |
| cam1 | section | 7 | F | F | 1 | 1 |
| cam1 | section | 7 | F | F | 2 | 3 |
| cam1 | section | 7 | F | F | 4 | 6 |

504m → Seat Type  506m → Section  508m → Min Row  510m → Max Row  512m → Min Seat  516m → Max Seat 518m → (cam1 row)
520m → (cam1 row)

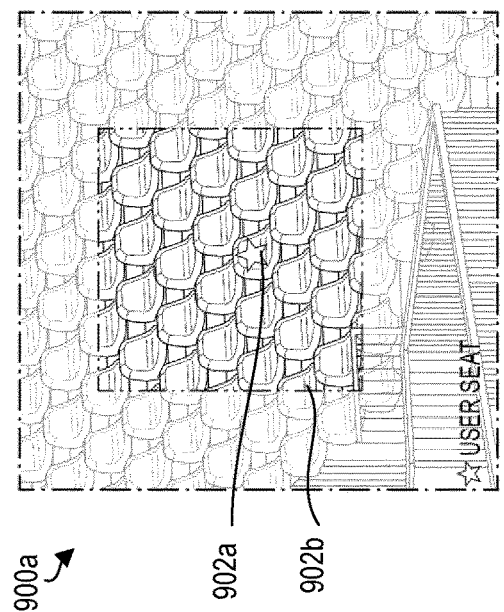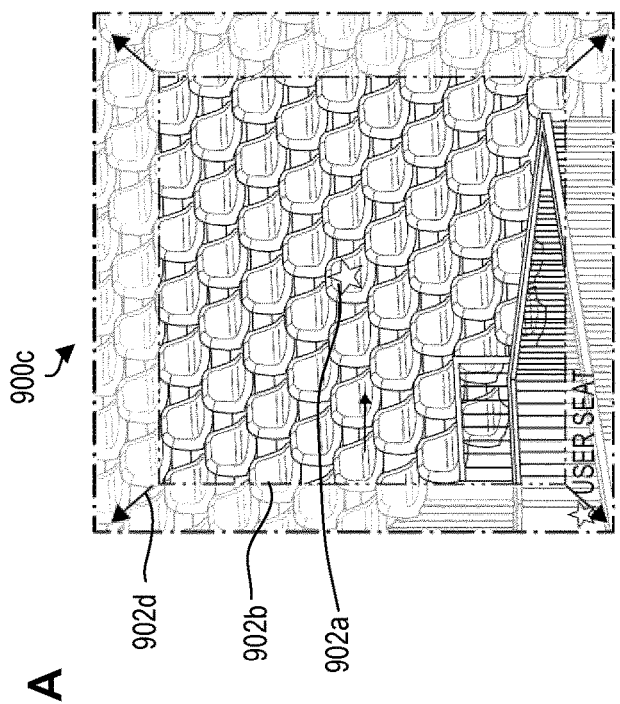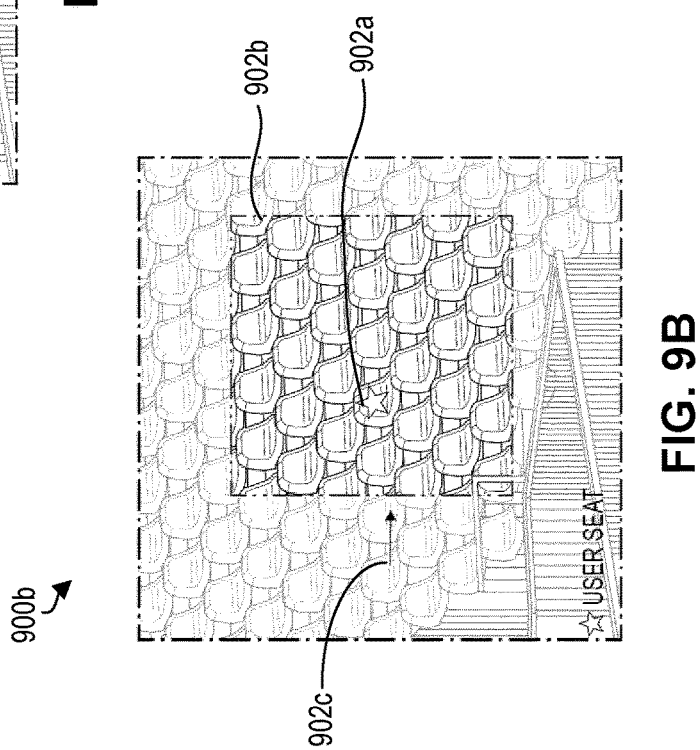

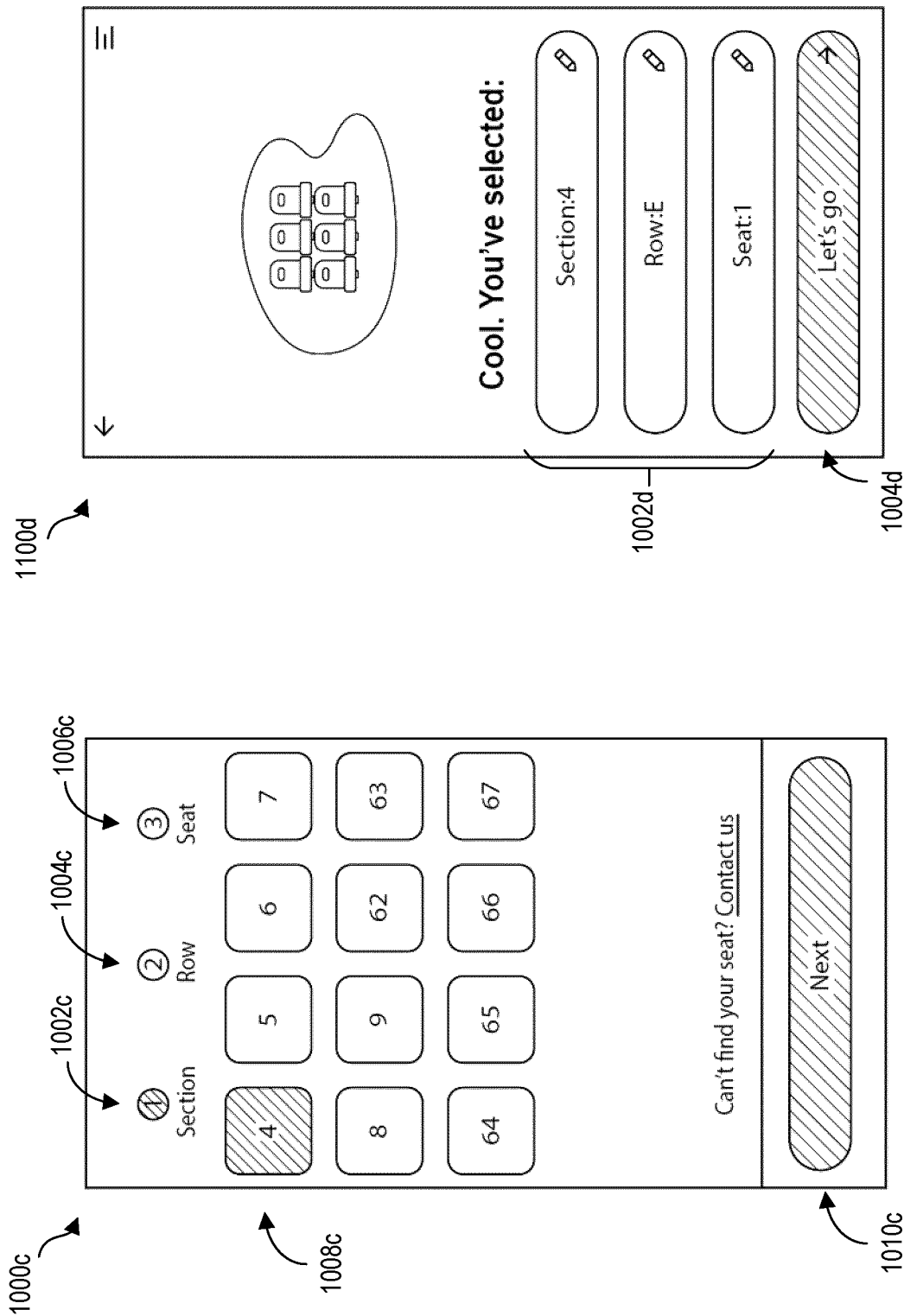

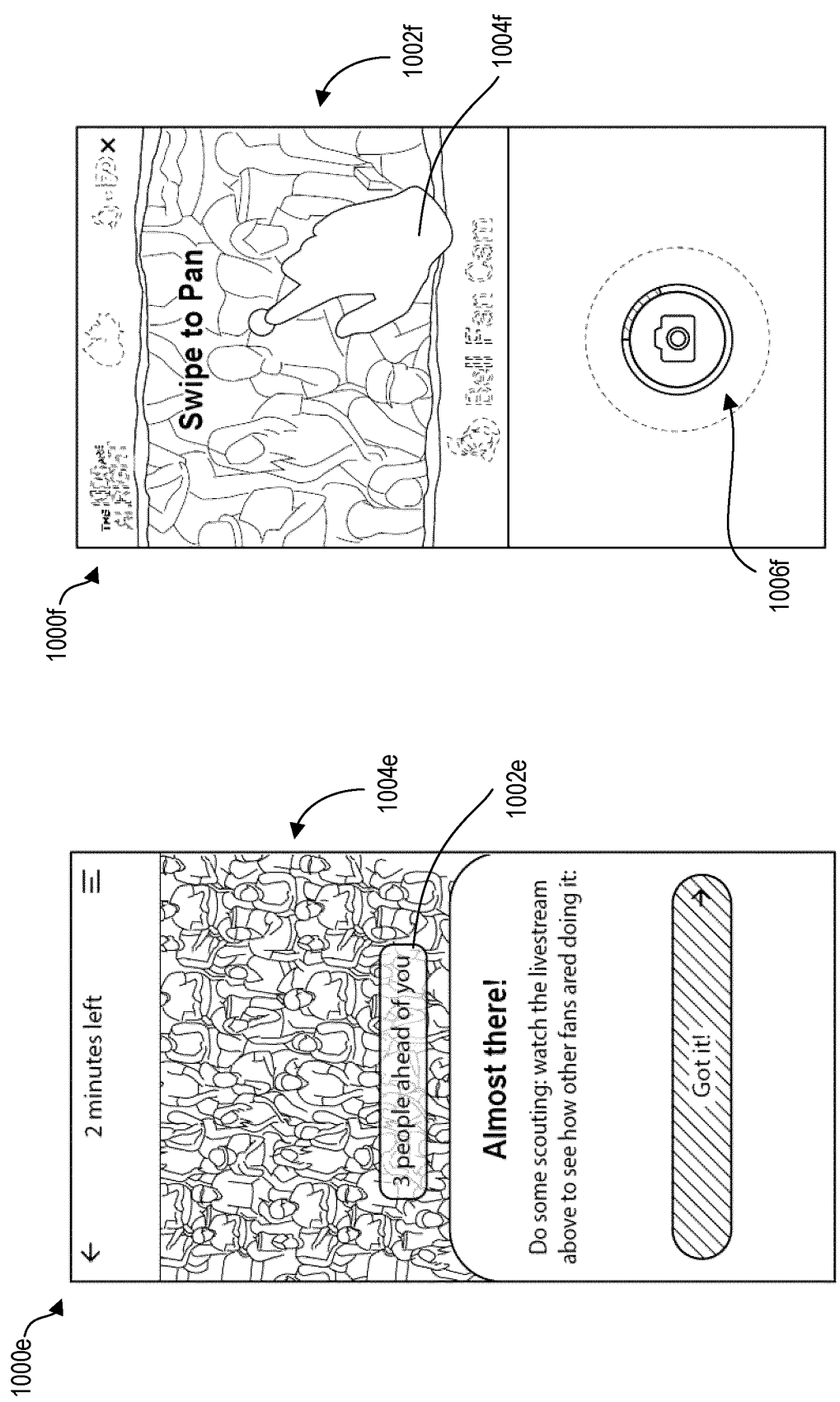

SYSTEM AND METHOD FOR AUTOMATED CONTROL OF CAMERAS IN A VENUE

FIELD

Various embodiments are described herein that generally relate to automated control of cameras, and in particular, to a system and method for automated control of cameras in a venue.

INTRODUCTION

Indoor and outdoor venues—such as sports venues, music venues and theater venues—often host an array of live events. Stadiums, for example, may be purposed to host, inter alia, sports events and live concerts which can attract large spectator audiences comprising individuals, or groups of individuals (i.e., families or colleagues). Venues can also include, for example, mini-golf courses, bowling alleys and curling arenas, as well as other spaces that allow for active participation of venue attendees. To this end, it has been appreciated that attendees at venues (i.e., audience spectators and/or event participants) often desire images or short video clips of themselves—or their accompanying group—that can serve as mementos or reminders of their time at the venue.

SUMMARY OF VARIOUS EMBODIMENTS

In accordance with a broad aspect of the teachings herein, there is provided at least one embodiment of a method for automated control of cameras in a venue setting, the method comprising: receiving a media capture request, wherein the media capture request comprises a request to capture a media of a target location in the venue; assigning a camera located in the venue to capture the media; accessing a camera-specific venue map associated with the assigned camera, wherein the camera-specific map comprises a mapping of one or more spatial regions in the venue to a corresponding one or more camera motor coordinates; identifying a spatial region, of the one or more spatial regions, that includes the target location; controlling the camera to aim at the target location based on the one or more camera motor coordinates associated with the spatial region; and controlling the camera to capture the media of the target location.

In at least one of these embodiments, the method is performed by a server processor of a server, wherein the server is in communication with each of a user device and the camera via a communication network, and the media capture request is received from a user device.

In at least one of these embodiments, the media comprises one or more of an image, a burst of images and a digital video clip.

In at least one of these embodiments, the camera is a pan, tilt camera, and each of the one or more camera motor coordinates, associated with each spatial region, comprises pan, tilt and rotation motor coordinates to aim the camera at the spatial region.

In at least one of these embodiments, each spatial region, defined in the camera-specific venue map, comprises a quadrilateral shaped area, and the one or more camera motor coordinates associated with each spatial region comprise pan and tilt coordinates for each corner of the parallelogram.

In at least one of these embodiments, the camera is a pan-tilt-zoom (PTZ) camera, and the camera-specific venue map includes a zoom value associated with each spatial region, the zoom value defining a degree of zoom for the camera when the spatial region is within the camera's field of view.

In at least one of these embodiments, controlling the camera to aim at the target location comprises: determining the position of the target location within the spatial region; identifying the pan and tilt motor coordinates for each corner of the quadrilateral defining the spatial region; and determining pan and tilt coordinates for aiming the camera at the target location by interpolating between the pan and tilt motor coordinates for each corner of the spatial region based on the determined position of the target location within the spatial area.

In at least one of these embodiments, after aiming the camera at the target location, the method further comprises: transmitting a real-time media stream from the camera to the user device, via the server.

In at least one of these embodiments, the method further comprises dynamically adjusting the number of frames per second and the quality factor of each frame, in the real-time media stream, to minimize latency.

In at least one of these embodiments, the method further comprises: receiving, from the user device, one or more commands for one or more camera adjustment operations; controlling the camera according to the one or more camera adjustments operations; and transmitting an adjusted real-time media stream from the camera to the user device, via the server.

In at least one of these embodiments, the method further comprises: receiving, from the user device, a media capture trigger; and in response to the media capture trigger, controlling the camera to capture the media of the target location.

In at least one of these embodiments, the venue includes a plurality of cameras, each camera having a corresponding camera-specific venue map, and selecting the camera to capture the media comprises: determining a mapped spatial region range of each camera-specific venue map; and selecting a camera having a mapped spatial region range that includes the target location.

In at least one of these embodiments, wherein assigning the camera to capture the media comprises: identifying at least two cameras having a mapped spatial region that includes the target location; determining a request queue for each of the at least two cameras; selecting the camera having the shortest request queue; and assigning the media capture request to the selected camera queue.

In at least one of these embodiments, the method initially comprises generating the camera-specific venue map by: defining a plurality of spatial regions, each spatial region defining an area in the venue; identifying a reference object within the spatial region range; capturing camera motor coordinates for each corner of the spatial region and relative to the reference object.

In at least one of these embodiments, the venue setting is one of a sports venue, a stadium, a mini-golf course, a bowling alley, a theater and a top golf course, and the target venue location is one of a seat number, a box number, a bowling alley lane number and a golf course hole number.

In accordance with another broad aspect of the teachings herein, there is provided at least one embodiment of a system for automated control of cameras in a venue setting, the system comprising: a user device; at least one camera located in the venue; a server, the server comprising one or more server processors configured to: receive, from the user device, a media capture request, wherein the media capture request comprises a request to capture a media of a target location in the venue; assign a camera, from the at least one camera, to capture the media; access a camera-specific venue map associated with the selected camera, wherein the camera-specific map comprises a mapping of one or more spatial regions in the venue to a corresponding one or more camera motor coordinates; identify a spatial region, of the one or more spatial regions, that includes the target location; control the camera to aim at the target location based on the one or more camera motor coordinates associated with the spatial region; and control the camera to capture the media of the target location.

In at least one of these embodiments, the system comprises a communication network, and the server is in communication with each of a user device and the camera via the communication network.

In at least one of these embodiments, the media comprises one or more of an image, a burst of images and a digital video clip.

In at least one of these embodiments, the camera is a pan, tilt camera, and each of the one or more camera motor coordinates, associated with each spatial region, comprises pan, tilt and rotation motor coordinates to aim the camera at the spatial region.

In at least one of these embodiments, each spatial region, defined in the camera-specific venue map, comprises a quadrilateral shaped area, and the one or more camera motor coordinates associated with each spatial region comprise pan and tilt coordinates for each corner of the parallelogram.

In at least one of these embodiments, the camera is a pan-tilt-zoom (PTZ) camera, and the camera-specific venue map includes a zoom value associated with each spatial region, the zoom value defining a degree of zoom for the camera when the spatial region is within the camera's field of view.

In at least one of these embodiments, controlling the camera to aim at the target location comprises the one or more server processors being configured to: determine the position of the target location within the spatial region; identify the pan and tilt motor coordinates for each corner of the quadrilateral defining the spatial region; and determine pan and tilt coordinates for aiming the camera at the target location by interpolating between the pan and tilt motor coordinates for each corner of the spatial region based on the determined position of the target location within the spatial area.

In at least one of these embodiments, after aiming the camera at the target location, the one or more server processors are configured to: transmit a real-time media stream from the camera to the user device, via the server.

In at least one of these embodiments, the one or more server processors are further configured to dynamically adjust the number of frames per second and the quality factor of each frame, in the real-time media stream, to minimize latency.

In at least one of these embodiments, the one or more server processors are further configured to: receive, from the user device, one or more commands for one or more camera adjustment operations; control the camera according to the one or more camera adjustments operations; and transmit an adjusted real-time media stream from the camera to the user device, via the server.

In at least one of these embodiments, the one or more server processors are further configured to: receive, from the user device, a media capture trigger; and in response to the media capture trigger, control the camera to capture the media of the target location.

In at least one of these embodiments, the venue includes a plurality of cameras, each camera having a corresponding camera-specific venue map, and selecting the camera to capture the media comprises the one or more server processors being further configured to: determine a mapped spatial region range of each camera-specific venue map; and select a camera having a mapped spatial region range that includes the target location.

In at least one of these embodiments, assigning the camera to capture the media comprises the one or more server processors being configured to: identify at least two cameras having a mapped spatial region that includes the target location; determine a request queue for each of the at least two cameras; select the camera having the shortest request queue; and assign the media capture request to the selected camera queue.

In at least one of these embodiments, the one or more server processors being further configured to initially generate the camera-specific venue map by: defining a plurality of spatial regions, each spatial region defining an area in the venue; identifying a reference object within the spatial region range; capturing camera motor coordinates for each corner of the spatial region and relative to the reference object.

In at least one of these embodiments, the venue setting is one of a sports venue, a stadium, a mini-golf course, a bowling alley, a theater and a top golf course, and the target venue location is one of a seat number, a box number, a bowling alley lane number and a golf course hole number.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, reference will be made, to the accompanying drawings. The drawings are not intended to limit the scope of the teachings described herein.

FIG. 5I is an example embodiment of a configuration file for reference camera motor coordinates;

FIG. 5L is an example of parsed summary data derived from one or more camera-specific maps;

FIG. 5M is another example of parsed summary data derived from one or more camera-specific maps;

FIG. 5N is an example row dictionary for a stadium venue;

FIGS. 9A-9C are example cropped viewable portions of image frames that may be displayed on a user device display; and FIGS. 10A-10I are various example screenshots of graphical user interfaces (GUIs) that may be displayed on a user device display.

Further aspects and features of the example embodiments described herein will appear from the following description taken together with the accompanying drawings.

DESCRIPTION OF VARIOUS EMBODIMENTS

Figure 1A:
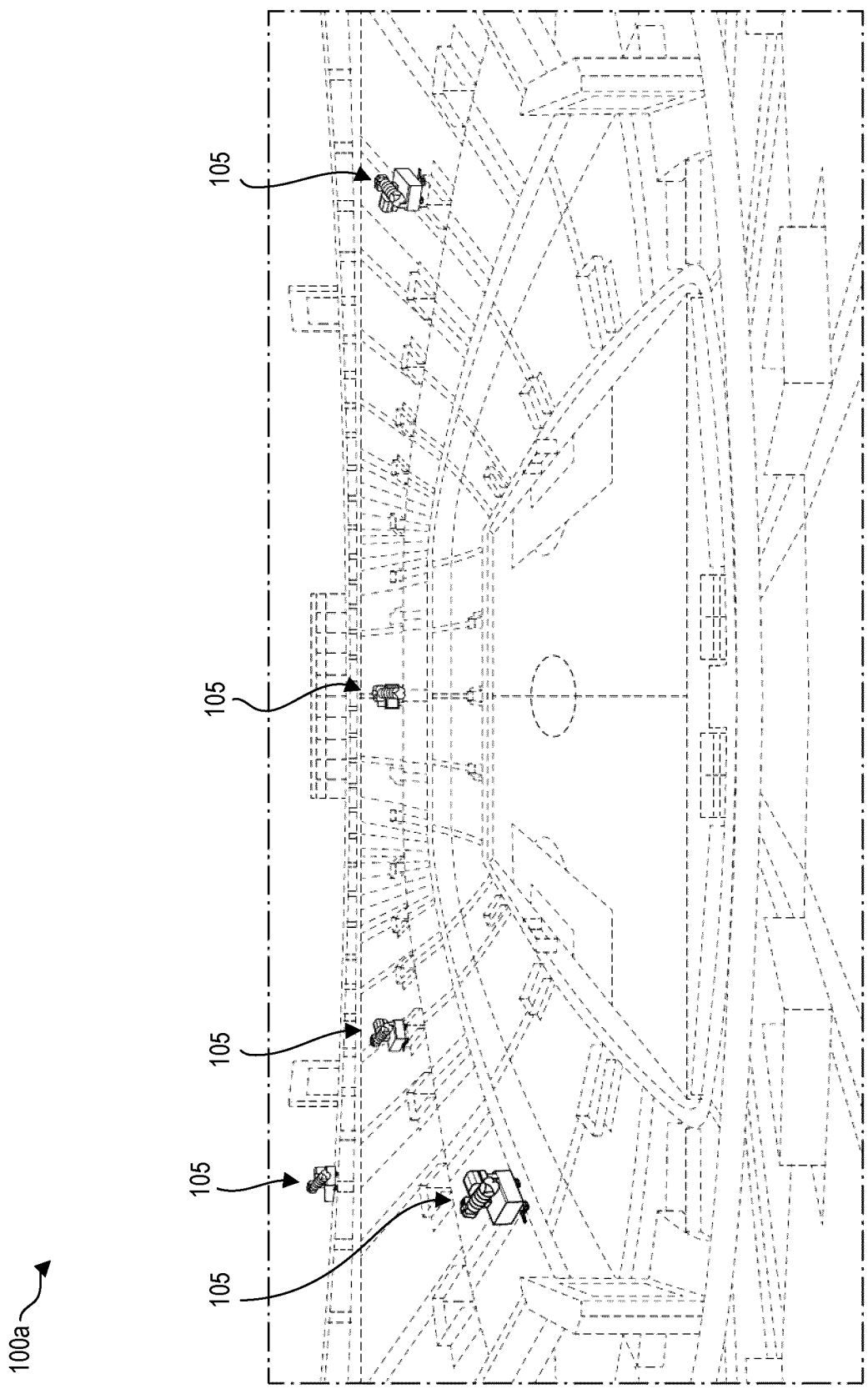
FIG. 1A is an example embodiment of an environment for a method and system for automated control of cameras in a venue.

Reference is now made to FIG. 1, which shows an example embodiment of an environment 100 in which the systems and methods provided herein may operate.

As shown, and in various cases, the environment 100 may be a venue for hosting various types of events. In the illustrated example, the venue is a stadium that can be purposed to host live events, including sporting events (i.e., football matches) as well live concerts and performances (i.e., musical and theatrical shows, political rallies and speeches, etc.). In other embodiments, the environment 100 can comprise any other type of venue for hosting spectator audiences, including indoor or outdoor theaters. In still yet other example cases, the environmental 100 may be a venue for hosting events that involve active attendee participation. For example, the environment 100 can be a mini-golf course, a golf driving range (i.e., a TopGolf® range), a bowling alley or a curling arena. Accordingly, it will be generally understood that the environment 100 can comprise any type of indoor or outdoor space for hosting any range of events.

As stated in the introduction, it has been appreciated that attendees at venues (i.e., audience spectators and/or event participants) often desire to capture images or short video clips of themselves—or their accompanying group—that can then serve as mementos or reminders of their time at the event.

Accordingly, the venue environment 100 includes one or more controllable cameras 105 that are positioned (i.e., installed) around various locations in the venue area. As explained in further detail, the cameras 105 may be remotely and/or autonomously controllable to aim at various target locations within the venue (i.e., seats, boxes or suites in a stadium or theater, or lanes in a bowling or curling arena, etc.) in order to capture a media of that location. As used herein, media may refer to any one or more of a photograph, an image burst, a digital video clip, or any other form of visual expression that can be generated by camera equipment. In provided embodiments, the cameras may be controllable to aim at a target location in response to receiving a media capture request from a user device associated with an individual located inside the venue, or otherwise, remotely located from the venue.

In at least one example application, a spectator or an event participant (i.e., a golfer or a bowler) may use their user device to transmit a request to capture a media of their location in the venue. In response, a controllable camera 105 can be assigned to capture the requested media. The assigned camera 105 can then be automatically controlled to aim at the user's location in the venue and capture a requested media of that location. The media may then be transmitted to the requesting user device, or otherwise may be made accessible to the requesting device on a server (i.e., a cloud server). In this manner, venue attendees may be able to control the cameras 105 to capture media of themselves, which can then serve as mementos or reminders of their time at the venue. In other example applications, a user device associated with a remote user may also be able to transmit a media capture request of a target location in a venue to capture media of other individuals located in the venue. For example, a user may desire to capture media of a group of friends or colleagues who are present at the venue. In still other example applications, a computer terminal associated, for example, with venue personnel (i.e., security personnel) may also be able to transmit media capture requests in order to observe certain target locations within the venue.

The cameras 105 in the venue can be positioned (i.e., installed) at any suitable location. For example, in various cases, the cameras 105 may be strategically positioned in the venue to ensure that each area of the venue is within at least one camera's field of view. In some cases, cameras 105 are positioned in the venue to ensure that each area of the venue is covered by two or more cameras. This can ensure that if one camera 105 is occupied (or otherwise non-operational), another camera is available to capture requested media of a target location.

In an example application where the venue comprises a stadium (i.e., FIG. 1), the cameras 105 may be located—for example—along various railings, columns, walls or other support structures located, for instance, in the audience seating area. In some cases, where the stadium includes a center screen (i.e., jumbotron), the cameras 105 may also be installed below or above the center screen. Similarly, in a venue comprising a bowling alley (FIG. 5B), the cameras may be positioned at various locations within, around or between the bowling alley lanes. In still another example application, where the venue comprises a mini-golf course (FIG. 5C), the cameras may be positioned on various support structures around the outer edge of the course, as well as—for example—between the greens, in order to capture any desired media in any target location within the golf course.

Figure 1B:
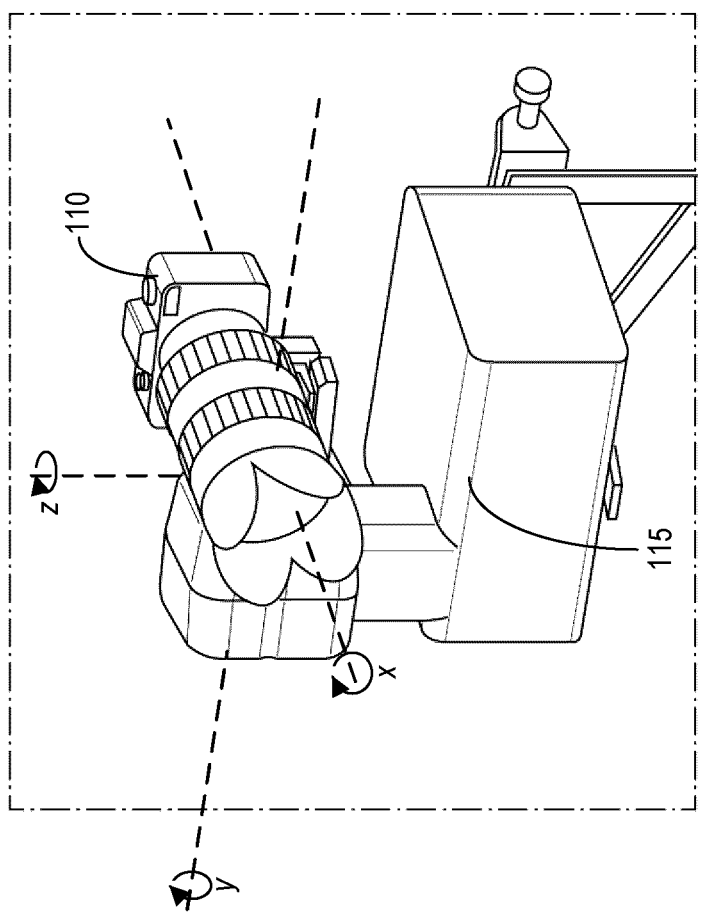
FIG. 1B is a schematic illustration of an example camera that may be located in a venue.

In various embodiments, the controllable cameras 105 may comprise pan tilt units (PTU) cameras. FIG. 1B shows an example PTU camera, which includes the imaging device portion 110 (i.e., the camera lens, etc.), as well as a camera controller box 115. The camera controller 115 can include, for example, one or more processors that are operably coupled to one or more motors (i.e., stepper motors) which can adjust the position of the camera (i.e., the pointing direction of the camera lens) along the x, y and z axis. For example, the camera motors may rotate the camera along a vertical z-axis to adjust the pan of the camera and, in turn, rotate the camera field of view from left-to-right. The camera motors can also rotate the camera along a first horizontal y-axis to adjust the tilt of the camera, or otherwise, to rotate the camera field of view up-and-down. In still other cases, the camera motors can rotate the camera along a horizontal depth axis-x to adjust the "rotation" of the camera. The camera's pan, tilt and rotation settings of a PTU camera may be referred to herein as the camera's motor coordinates.

In other embodiments, the controllable cameras may also comprise pan tilt zoom units (PTZU). In these cases, the camera may have an added functionality of varying the zoom level based on commands from the camera controller 115.

As used herein, the total imaging range of a given camera—across all possible or allowable pan, tilt, rotation and zoom settings—may be referred to herein as the camera imaging range.

Figure 2A:
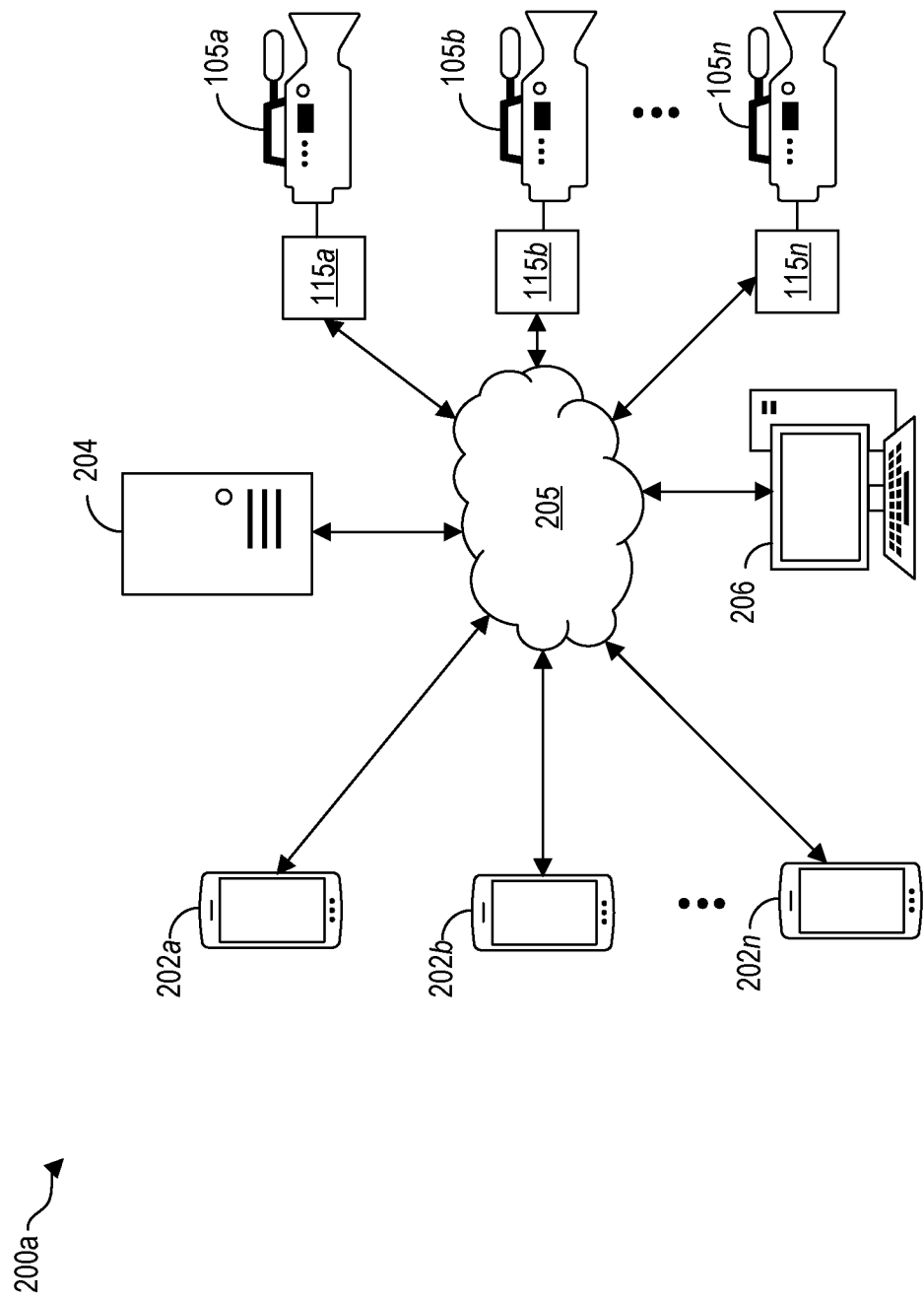
FIG. 2A is a simplified block diagram of an example system for automated control of cameras in a venue.

Reference is now made to FIG. 2A, which shows a simplified block diagram of an example embodiment of a system 200a for automated control of cameras in a venue.

As shown, the system 200a generally includes one or more cameras 105a-105n controllable by one or more respective camera controllers 115a-115n. The camera controllers 115 are in turn connected, via network 205, to a server 204 and one or more user devices 202a-202n. In various embodiments, the camera controllers 115 are connected to the user devices 115 via server 204 and network 205. In some cases, an administrator (or operator) computer 206 may also couple to the network 205 (i.e., to the server 204, or directly to the camera controllers 115).

Cameras 105 may be any suitable imaging devices that can be used to capture media (i.e., photographs, image bursts and/or video clips). In various example cases, the cameras 105 can be photography cameras such as single-lens reflex (SLR) cameras or digital single-lens reflex (DSLR) cameras. In other example cases, the cameras 105 may be mirrorless interchangeable-lens cameras (MILC), or mirrorless cameras (i.e., digital single lens mirrorless (DSLM) camera)). In still other cases, the cameras 105 can be point-and-shoot cameras (i.e., compact digital cameras)). In still yet other cases, the cameras 105 may be thermographic or infrared cameras. As stated previously, the cameras 105 can be PTU or PTZU cameras that are controllable via the camera controllers 115. In the illustrated example embodiment, a single camera controller 115 is provided in association (i.e., in communicative coupling) with each camera 105. However, in other cases, a single controller 115 can also be coupled to a plurality of cameras to control the pan, tilt, rotation and zoom of each camera. While each camera controller 115 is illustrated as being directly coupled to a respective camera 105, in some cases, each camera controller 115 may also couple to each camera via the network 205, rather than a direct connection. In other embodiments, the controllers 115 may also be integrated as part of the server 204, and the server 204 may be connected to the cameras either directly (i.e., a USB or wired connection), or via the network 205.

Network 205 may be connected to the internet. Typically, the connection between network 205 and the Internet may be made via a firewall server (not shown). In some cases, there may be multiple links or firewalls, or both, between network 205 and the Internet. In other cases, connections may be made via the network 205 using a proxy server, and in other cases, the network 205 may be a private network. Some organizations may operate multiple networks 205 or virtual networks 205, which can be internetworked or isolated. These have been omitted for ease of illustration, however it will be understood that the teachings herein can be applied to such systems. Network 205 may be constructed from one or more computer network technologies, such as IEEE 802.3 (Ethernet), IEEE 802.11 and similar technologies, and can be wired or wireless. In various cases, network 205 may be a WiFi® or cellular network.

Server 204 is a computer server that is connected to network 205. Server 204 has a processor, volatile and non-volatile memory, at least one network interface, and may have various other input/output devices. As with all devices shown in the system 200a, there may be multiple servers 204, although not all are shown. It will also be understood that the server 204 need not be a dedicated physical computer. For example, in various embodiments, the various logical components that are shown as being provided on server 204 may be hosted by a third party "cloud" hosting service such as Amazon™ Web Services™ Elastic Compute Cloud (Amazon EC2). In embodiments provided herein, the server 204 may coordinate communication between the user devices 202 and/or administrator computer 206 and one or more camera controllers 115.

User devices 202 may be any suitable computing devices, such as a desktops computers, and may also include mobile devices such as smartphones, tablets or laptops. In various example cases, the user devices 202 may be associated with venue attendees (i.e., spectators in a stadium, event participants or venue personnel). In some cases, user devices 202 may also include devices associated with users who are located remotely from the venue. In embodiments provided herein, users of the user devices 202 may use the user devices 202 to transmit media capture requests to the server 204 in order capture a media of a target location using the one or more of the cameras 105.

Administrator computer 206 may also be any computing device, similar to the user devices 202. In embodiments provided herein, the administrator computer 206 can be used during the initialization stage, wherein each camera 105 is mapped with respect to different spatial regions in the venue. The administrator computer 206 can also be used, more generally, to adjust different camera configuration settings stored in a memory of each of the camera controllers 115 or server 204. In this manner, administrator computer 206 can be viewed as yet another user device located on the network 205, but is allocated an additional level of access (i.e., access privileges) to the server 204 and/or camera controllers 115 that is not necessarily otherwise provided to the other user devices 202 on the network 205.

Similar to the server 204, each of the user devices 202 and/or administrator computer 206 may each include a processor, volatile and non-volatile memory, at least one network interface. User devices 202 and/or administrator computer 206 may also include one or more input interfaces (i.e., keyboards, mouses, etc.) as well as display devices (i.e., an LCD screen).

Figure 2B:
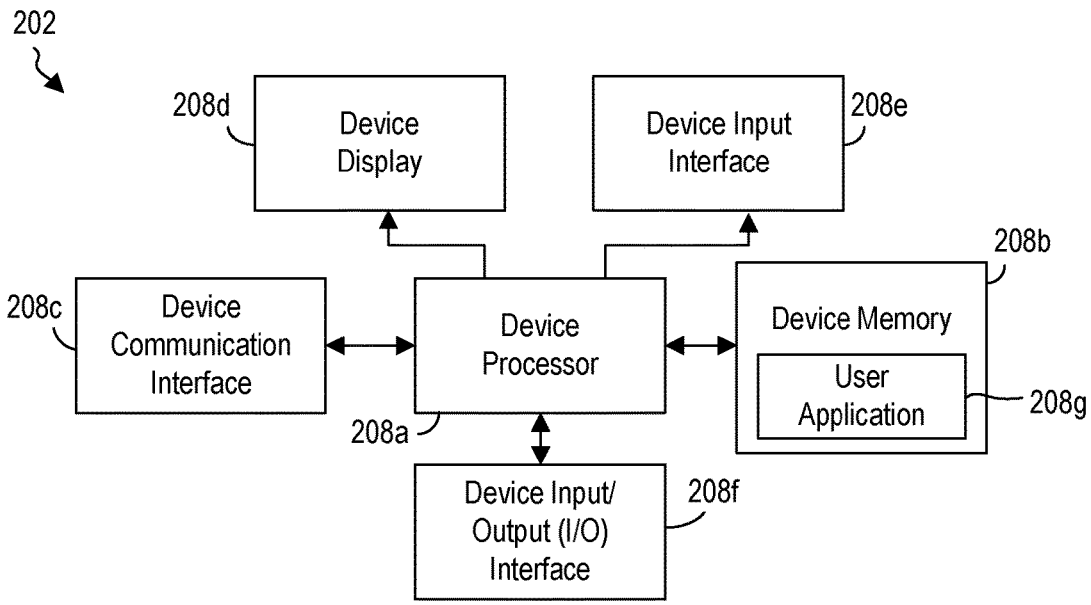
FIG. 2B is a simplified block diagram of an example embodiment of a user device.

Reference is now made to FIG. 2B, which shows a simplified block diagram of an example embodiment of a user device 202, in accordance with some embodiments.

As shown, the user device 202 can include a device processor 208a coupled, via a computer data bus, to a device memory 208b. The device processor 208a may also couple to one or more of a device communication interface 208c, a device display 208d, a device input interface 208e and/or a device input/output (I/O) interface 208f.

Processor 208a is a computer processor, such as a general purpose microprocessor. In some other cases, processor 208a may be a field programmable gate array (FPGA), application specific integrated circuit (ASIC), microcontroller, or other suitable computer processor. In at least one embodiment, the user device 202 may include more than one processor (e.g., a multi-processor device), with each processor being configured to execute the same or different program instructions. In such embodiments, a single processor may perform all acts of a method (i.e., executing instructions, etc.) or multiple processors may be used for performing different (or overlapping) acts of the method in any manner, order or arrangement.

Processor 208a is coupled, via computer data bus, to memory 208b. Memory 208b may include both a volatile and non-volatile memory. Non-volatile memory stores computer programs consisting of computer-executable instructions, which may be loaded into volatile memory for execution by processor 208a as needed. It will be understood by those skilled in the art that reference herein to the user device 202 as carrying out a function, or acting in a particular way, imply that processor 202 is executing instructions (e.g., a software program) stored in memory 208b and possibly transmitting or receiving input data and output data via one or more interfaces. Memory 208b may also store input data to, or output data from, processor 208a in the course of executing the computer-executable instructions.

In various embodiments, the memory 208b can store a client-side software user application 208g. The software application 208g may be a standalone program (or software application) that is downloaded and installed on the user device 202. In other embodiments, the user application 208g may be integrated into a third-party software application, which itself, is downloaded and installed on the user device 202 (e.g., through an app store such as the Apple App Store or Google Play).

As provided herein, user application 208g may be a software application that allows a user, of the user device 202, to interact with one or more of the cameras 105 located within the venue. For example, the user application 208g may be operable to present a graphical user interface (GUI) to the user on the device display 208d. The GUI may allow a user to transmit a media capture request to capture a media of a target location (i.e., the users seat, box or suite in a venue). In response, the user application 208g may transmit the request, i.e., to the server 204, and may receive back a captured media of the target location. In other cases, after transmitting the media capture request, the user application 208g may also receive—i.e., from server 204—a live media feed from a camera that is assigned by the server to capture media of the target location. The live media feed may be the current real-time or near real-time view of the camera as it is aimed at the target location. The live media feed may be displayed to the user, via a GUI of the user application 208g, to allow the user to observe what the camera is "seeing". In some cases, the user application 208g may permit the user to also input one or more camera view adjustment instructions to adjust the camera view, based on the viewable live feed, and the user device 202 can receive an adjusted camera view feed from the server 204 in real-time or near real-time.

Communication interface 208c is one or more data network interface, such as an IEEE 802.3 or IEEE 802.11 interface, for communication over a network (i.e., network 205). As used herein, reference to a user device 202 as transmitting or receiving data imply that the processor 208a is transmitting or receiving data via the communication interface 208c.

Display device 208d may be any suitable output interface and may be, for example, an LCD screen. In various cases, the display device 208c may display a GUI generated by the user application 208g.

Device input interface 208e may include various interfaces for receiving user input data (e.g., mouse, and keyboard, etc.). In some cases, the input interface 208e may be included in the display device 208d, such as in the case of a touchable display screen. In other cases, the input interface may be provided separately from the display device 208d.

Input/output (I/O) interface 208f may be any interface that can be used to couple the user device 202 to other external devices (i.e., via USB link).

While not explicitly shown, the administrator computer 206 may have a similar hardware architecture as the user device 202.

Figure 2C:
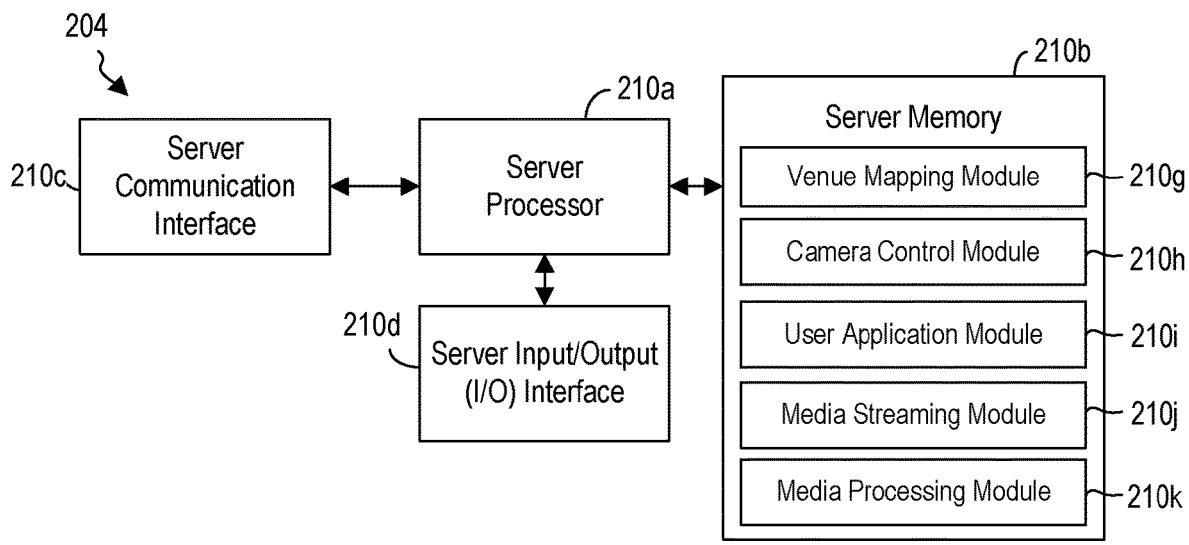
FIG. 2C is a simplified block diagram of example embodiment of a server.
Figure 2D:
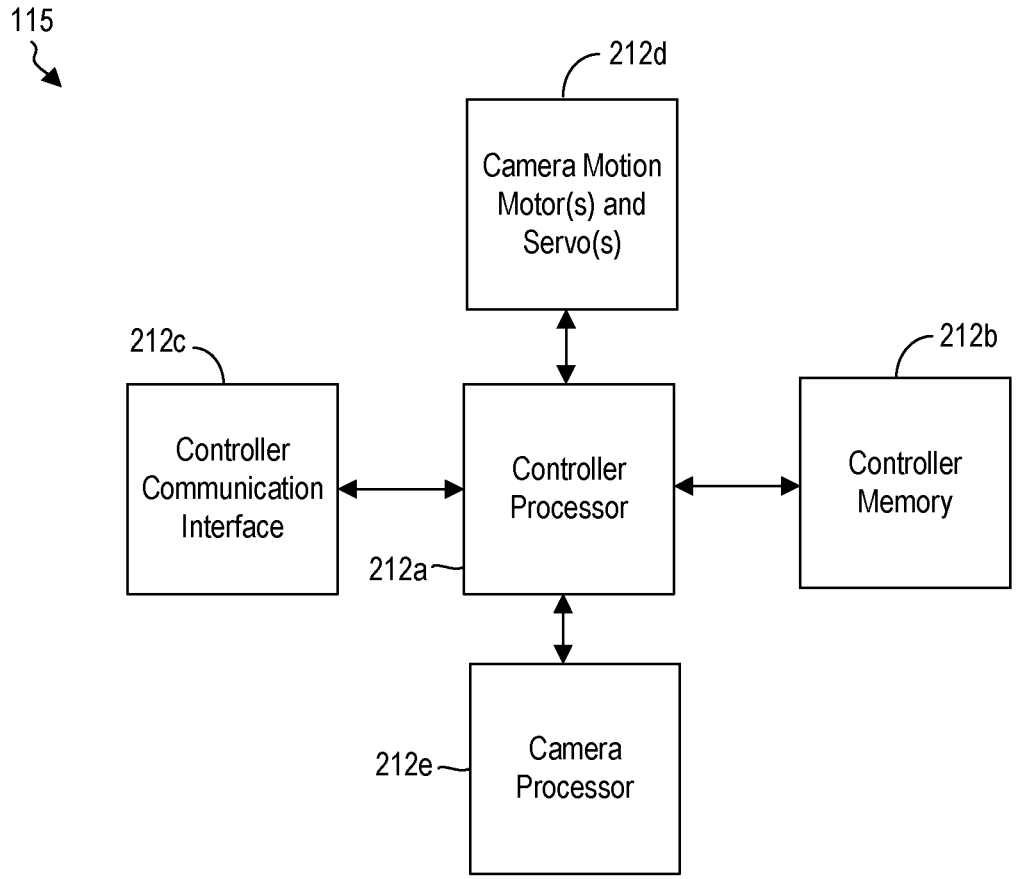
FIG. 2D is a simplified block diagram of an example embodiment of a camera controller.

Reference is now made to FIG. 2C, which shows a simplified block diagram of example embodiment of a server 204, in accordance with some embodiments.

As shown, the server 204 may also generally include a server processor 210a in communication, via a computer data bus, to a server memory 210b. The server processor 210a and server memory 210b may be analogous to the device processor 210a and device memory 210b. The server processor 210a may also couple to one or more of a server communication interface 210c and a server input/output (I/O) interface 210d.

In at least some embodiments, the server memory 210b can store several software "modules"—each of the software modules may be, for example, implemented in a separate software program stored on the server memory 210b, or multiple modules may be implemented by a single software program. In other cases, multiple software programs may be operable to implement one or more of the same modules, or different portions of the one or more modules.

As shown, the server memory 204b can include one or more of a venue mapping module 210g, a camera control module 210*h*, a user application interaction module 210*j*, an image processing module 210*j* and/or a media processing module 210*k*.

As explained in greater detail herein, the venue mapping module 210*g* can be a software module used to generate one or more camera-specific venue maps. As provided herein, each camera may have an associated camera-specific venue map which correlates different spatial regions in the venue to corresponding camera motor coordinates (i.e., pan, tilt, and in some cases, rotation). The camera-specific venue map can also include other camera configuration settings in association with each spatial region in the venue (i.e., camera zoom settings). Accordingly, when a media capture request is received to capture a media of a target location, the camera-specific venue map can be referenced to identify the relevant camera motor coordinates to aim the camera at the target venue location. In various embodiments explained herein, the venue mapping module 210*g* may be accessible by the administrator computer 206 to allow an administrator or operator to configure the camera-specific maps for each venue camera. Once a camera-specific map has been generated, it may be archived—for example—on the server memory 210*b*, in association with the corresponding camera.

Camera control module 210*h* can be a software module that interacts with each camera controller 115 to transmit various camera control settings to vary various camera configuration settings. For example, the camera control module 210*h* can transmit pan, tilt and zoom commands to a given camera controller 115, which the camera controller 115 can—in turn—translate into actual motor control signals to the camera motor, i.e., in a PTU or PTZU camera. In various cases, the camera control module 210*h* can transmit appropriate commands to a camera controller 115 based on accessing an associated camera-specific venue map, previously generated by the venue mapping module 210*g*.

In various cases, the camera control module 210*h* can also control other camera configuration settings including the camera's ISO, white balance, metering, shutter speeds, aperture, etc. to ensure high image quality (i.e., based on the time of day, and indoor/outdoor settings). In some cases, different profile settings can be used depending on factors such as the venue location and time of day.

User application module 204*i* may be a software module that allows for interaction between the server 204 and various user devices 202 communicating with the server 204. For example, the user application module 204*i* may receive data from each user device (i.e., a media capture request), and can also transmit data to each user device (i.e., a live media stream, or one or more media captures). In various cases, the user application module 210*i* communicates with the user application 208*g* on each user device 202.

Media streaming module 204*j* is a software module can be used to receive media streams from a camera, and to transmit the media stream to a requesting user device in real-time or near real-time.

Media processing module 204*k* is a software module that can be used to process, for example, images or video frames, i.e., in real-time or near real-time, generated by the camera 105. For instance, this can include processing images or video frames received from the camera 105 from the media streaming module 204*j*. In some example embodiments the media processing module 204*k* can be used to effect one or more digital image or video frame adjustments to compensate, for example, for the angled placement of the camera in the venue, or the cameras rotation setting, such that the images do not appear angled or rotated to the user (i.e., digitally straighten the photo or otherwise digitally flatten the perspective view so that the imaged objects appear "head on"). In other disclosed embodiments, the media processing module 204*k* may also crop images or video frames received from a camera 105 via the media streaming module 204*j*. For example, as explained, the media processing module 204*k* can crop image or video frames to provide to a receiving user only a viewable portion of the entire image or video frame. In other embodiments, the media processing module 204*k* may also apply one or more image enhancement operations to media received from a camera 105. For example, the media enhancement operations can include correcting the brightness, saturation, gamma, histogram equalization as well as other corrections and filters that can improve the output media quality.

Reference is now made to FIG. 2C, which shows an example embodiment of a camera controller 115, in accordance with some embodiments.

As shown, the camera controller 115 may include a controller processor 212*a* connected, via a data bus, to a controller memory 212*b* and/or a controller communication interface 212*c*. Controller processor 212*a*, controller memory 212*b* and controller communication interface 212*c* may be analogous to the processor 208*a*, memory 208*b* and communication interface 208*c* of user devices 202. Controller processor 212*a* may also couple to camera motion motor(s) and servo(s) 212*d*, which control re-orientation and movement of the camera in the pan, tilt and rotation domains, as well as the camera lens zoom (i.e., rotating the lens in and out). Still further, controller processor 212*a* can communicate with the camera processor 212*e*, which allows for controlling various other camera configuration settings (i.e., camera zoom)

In various embodiments, the controller processor 212*a* can receive, i.e. via communication interface 204*d*, one or more control signals from the server 204, via network 205. For example, the camera control module 210*h* may transmit camera configuration settings in association with a camera 105 coupled to the camera controller 115 (i.e., pan, tilt, rotation, and zoom). The camera processor 212*a*, in turn, can control the camera motors 212*d*, or transmit corresponding control signals to the camera processor 212*e* to configure, for example, the camera zoom. The controller processor 212*a* may also receive, from the camera processor 212*e*, real-time or near real-time video streams of the area the camera is directed to. In turn, the controller processor 212*a* can transmit the video stream to the media stream module 210*j* of server 204.

In various cases, the controller processors 212 can be used to establish a connection with the server 204 (i.e., an SSH tunnel connection). This allows for remote access to the controller 115 (i.e., via the server 204) to perform, for instance, debugging and software updates.

Figure 3:
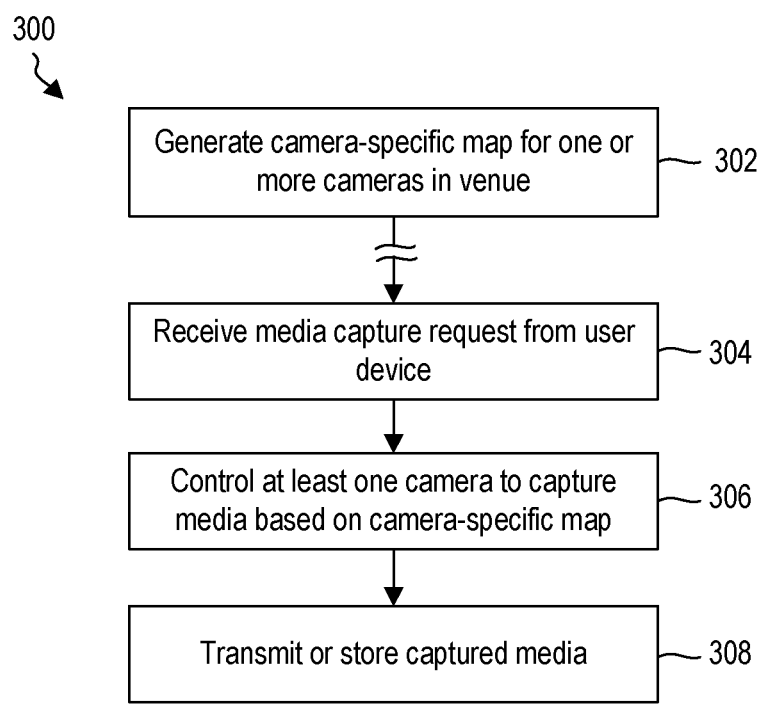
FIG. 3 is an example embodiment of a method for automated control of cameras in a venue.

Reference is now made to FIG. 3, which shows an example embodiment of a method 300 for automated control of cameras in a venue. Method 300 is performed, for example, by the server processor 210*a*.

At act 302, a camera-specific venue map is generated for one or more cameras located in the venue. As explained herein, each camera-specific map includes a mapping of various spatial regions—located within the venue—to corresponding camera motor coordinates, and is used for quick referencing when directing a camera to aim at a particular spatial region within the venue.

At act 304, at a subsequent point in time—denoted in FIG. 3 by a broken line—(i.e., during a live event at the venue), the server processor 210*a* may receive a media capture request from one or more user devices (herein referred to as the requesting devices). The media capture request may include, for example, an indication of a target location in the venue where the media can be captured. The requesting device may be associated with an event participant (i.e., a spectator or player), or any other user that may—or may not be—in attendance at the venue.

At act 306, in response to receiving a media capture request—the server 204 may control at least one camera to capture the requested media. The camera can be controlled to aim at the target location with reference to the camera's camera-specific venue map.

At act 308, the captured media can be stored for subsequent access by the requesting user device 202. For instance, the captured media can be stored on the server memory 210*b*, or any other storage location. In other cases, the captured media can be transmitted directly to the requesting device 202.

Figure 4A:
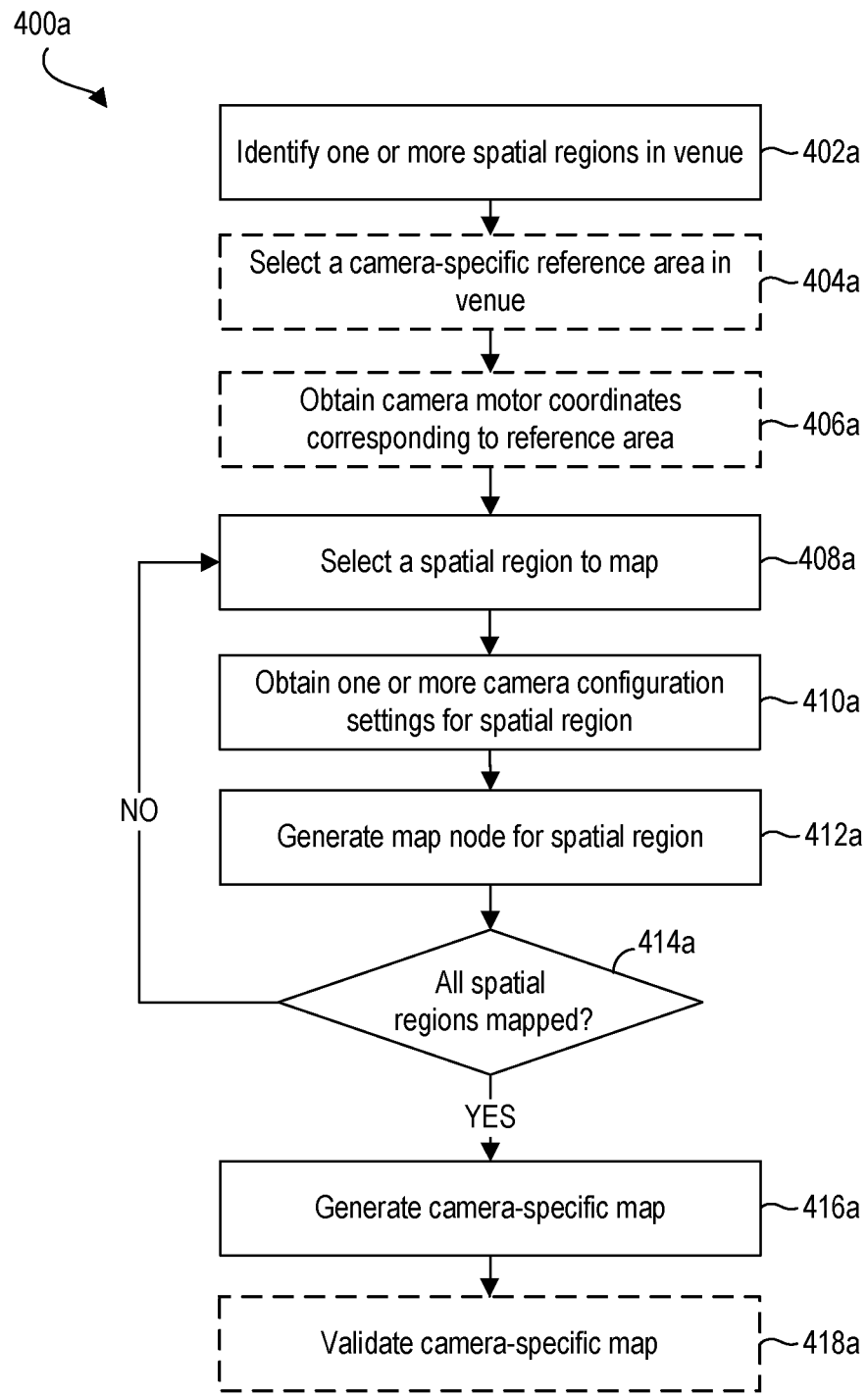
FIG. 4A is an example embodiment of a method for generating a camera-specific venue map, in accordance with at least some embodiments.

Reference is now made to FIG. 4A, which show an example embodiment of a method 400*a* for generating camera-specific venue maps, in accordance with at least some embodiments. Method 400*a* may be performed, for example, by the server processor 210*a*.

As provided herein, method 400*a* allows for generating a map that correlates various spatial regions within the venue to corresponding camera motor coordinates (i.e., pan, tilt, rotation). Accordingly, when a media capture request is received from a user device, the camera-specific map is referenced to automatically direct the camera to the target location associated with that request based on the camera-specific map. In various cases, the camera-specific map can also define other camera configuration settings for each spatial region in the venue (i.e., different zoom levels for different spatial regions). Each camera located in the venue may have it's own unique camera-specific map that is dependent on the cameras installation location and orientation in the venue. Accordingly, method 400 may be iterated for each camera in the venue to generate each camera's camera-specific map.

As shown in method 400*a*, at act 402*a*, one or more spatial regions (or spatial areas) are identified in the venue to map to camera motor coordinates.

Figure 5A:
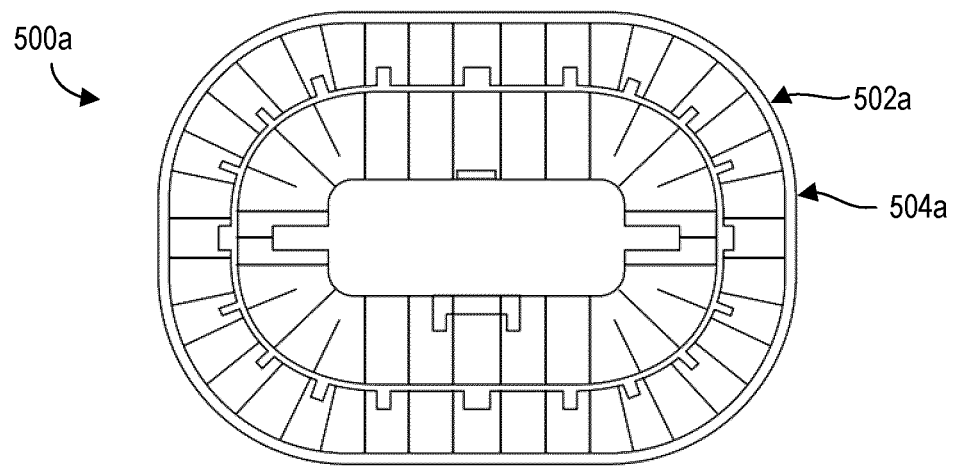
FIG. 5A is a schematic illustration of an example map for a stadium venue.

For example, in an example case where the venue is a stadium or theater—each spatial region can define a subset area of the venue where the spectators are seated. For instance, FIG. 5A illustrates an example stadium venue having one or more spectator seating sections i.e., 502*a*, 504*a*. In some cases, each seating section can define a separate spatial region in the venue. In other cases, each seating section can, itself, be divided into one or more spatial regions. For example, each seating section can be divided to one or more spatial regions, each defining a subset group of seats located in the venue. In various cases, by using smaller area spatial regions, a more accurate camera-specific map can be generated.

Figure 5B:
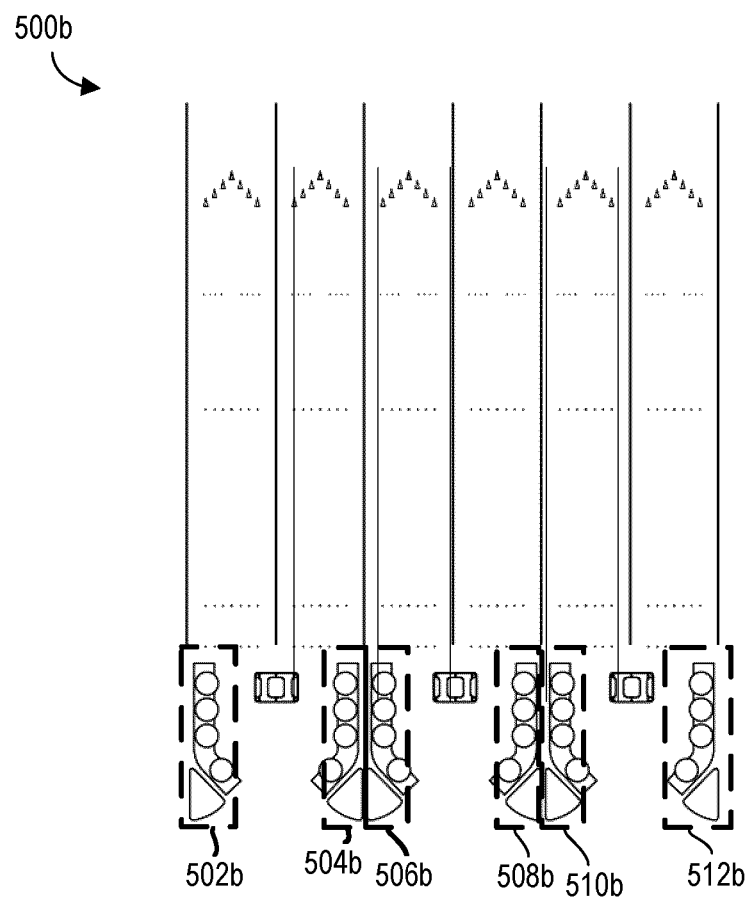
FIG. 5B is a schematic illustration of an example layout for a bowling alley venue.

FIG. 5B illustrates another example application, where spatial regions are defined in a bowling alley venue. In this case, each spatial region can correspond to a different bowling lane in the bowling alley. For example, the spatial regions 502*b*-512*b* can each correspond to a separate bowling lane. In the illustrated example, the spatial regions 502*b*-512*b* can define the area where the bowling participants are seated. In other cases, each spatial region can define the area where the bowlers stand prior to rolling the ball.

Figure 5C:
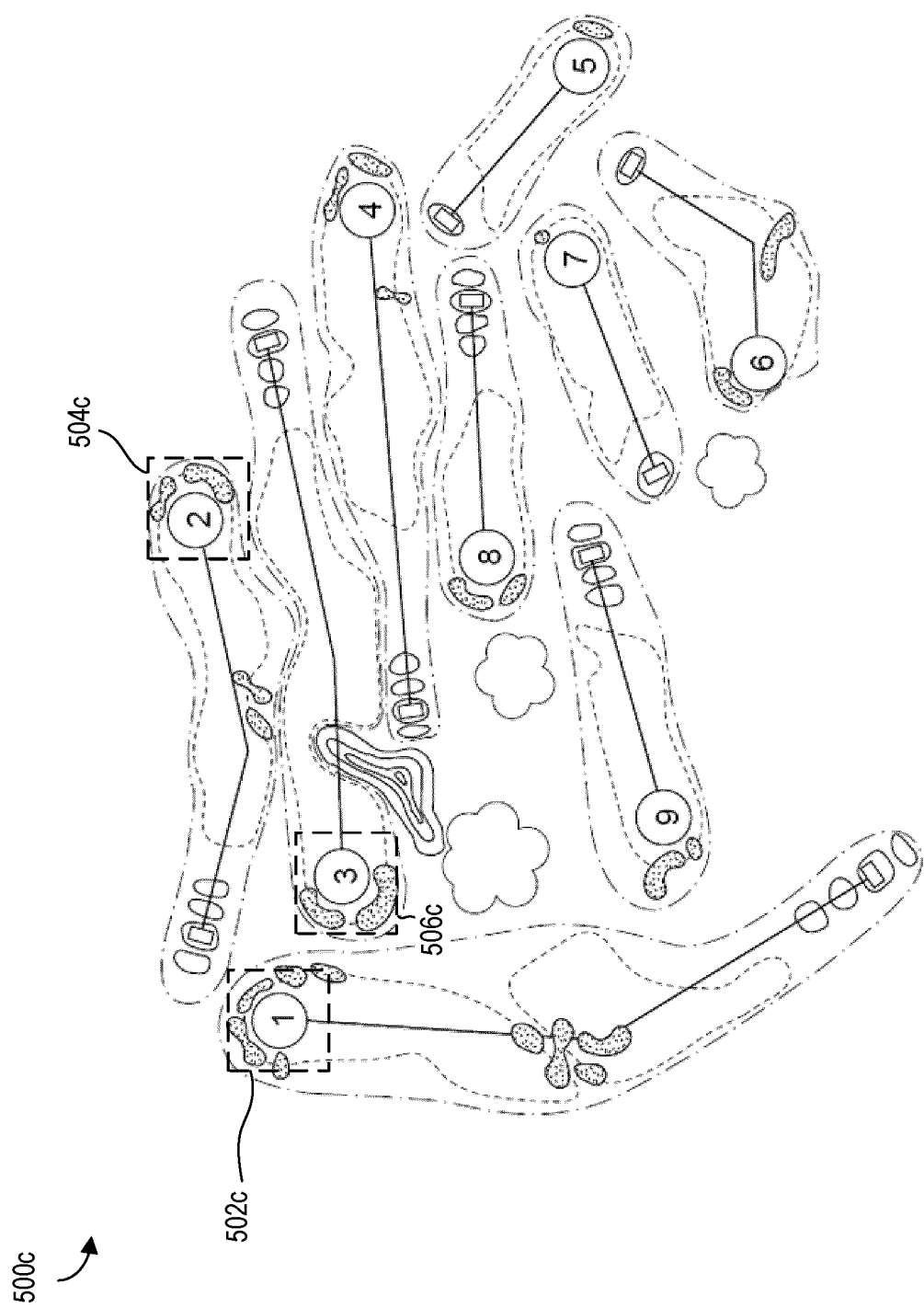
FIG. 5C is a schematic illustration of an example layout for a mini-golf course venue.

FIG. 5C illustrates still another example application, where spatial regions are identified for a mini-golf course venue. In this case, each spatial region may correspond to a different hole or green on the golf course. For example, spatial regions 502*c*, 504*c* bound the tee area where the golf participants are initially located.

In still yet other example cases, the venue may be a golf driving range having a number of golfing bays that participants can occupy. In these cases, the spatial mapping can correspond to the location of each bay in the driving range. A driving range can also include a plurality of "boxes" (as is commonly found Topgolf® courses), and the spatial mapping may correspond to the location of one or more boxes in the driving range.

Accordingly, it will be understood that the spatial regions can be defined in any manner and having regard to the specific venue where the cameras are installed. For ease of discussion, the remainder of the discussion will focus primarily on an example application involving cameras located in a stadium. However it will be understood that the methods and systems disclosed herein may equally apply to any other venue where cameras may be installed.

The spatial regions defined at act 402*a* may have any suitable geometric properties (i.e., shape, size or area). As well, different spatial regions within the same camera-specific map may have similar or different geometric properties.

Figure 5D:
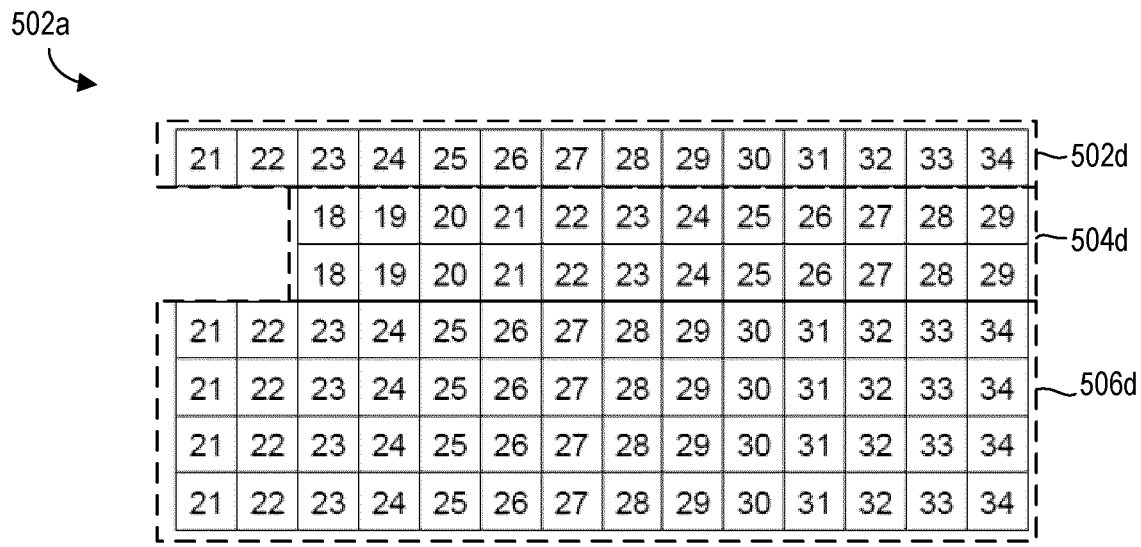
FIG. 5D is an illustration of a seating arrangement in a stadium venue.

In some example cases, each spatial region can comprise a quadrilateral-shaped area having four sides and four corners. FIG. 5D shows one or more quadrilateral-shaped spatial regions 502*d*, 504*d*, 506*d* in the context of mapping a stadium or theater's spectator seating area. As shown, each spatial region is a rectangular shaped area that includes one or more spectator seats. Each rectangular spatial region can include, for example, one row of seats or multiple rows of seats. In some cases, a spatial region may even define only a single seat.

Figure 5E:
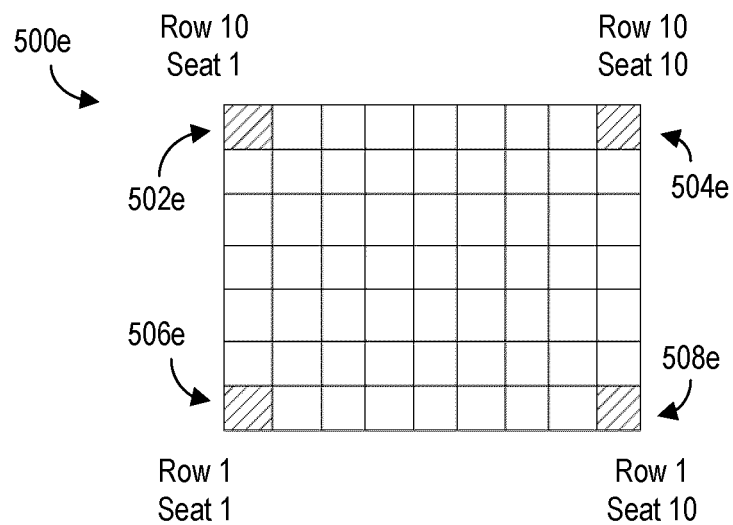
FIG. 5E is an example quadrilateral shaped spatial region located in a stadium venue.

FIG. 5E shows one example spatial region 500*e*, also in the context of mapping a stadium or theater's seating area. As shown, the rectangular spatial region includes four corners 502*e*, 504, 506*e*, 508*e*—each corner of the spatial region 500*e* corresponds to a seat in the stadium. As explained herein, by aligning the spatial region corners with the seat locations, an interpolation method can be used to identify camera motor coordinates for seats located within the spatial region. This avoids having to map the camera motor coordinates for each individual seat in the venue, which may be otherwise an arduous and time-intensive process.

Figure 5F:
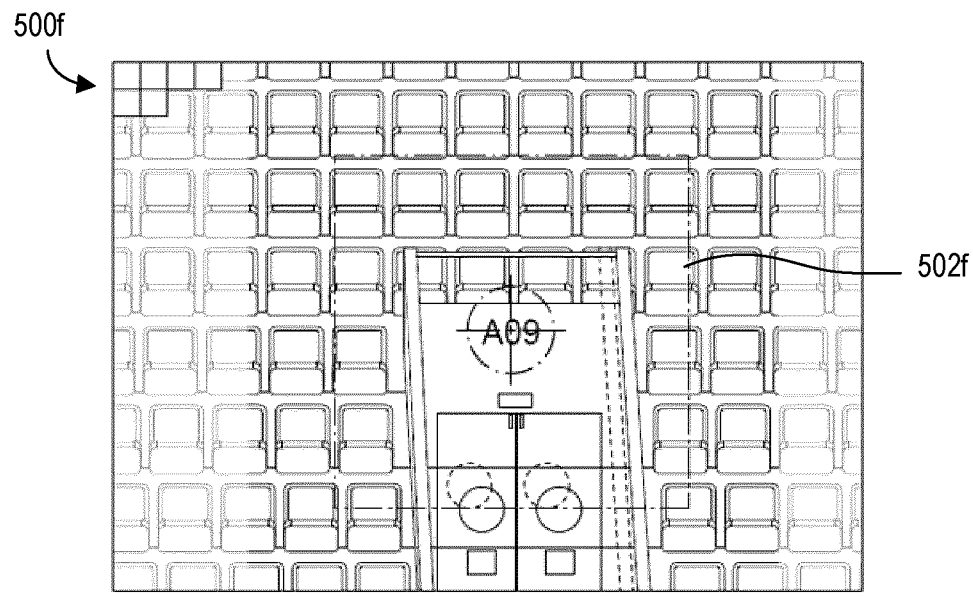
FIG. 5F is a schematic illustration of an example camera-specific reference region located in a stadium venue.
Figure 5G:
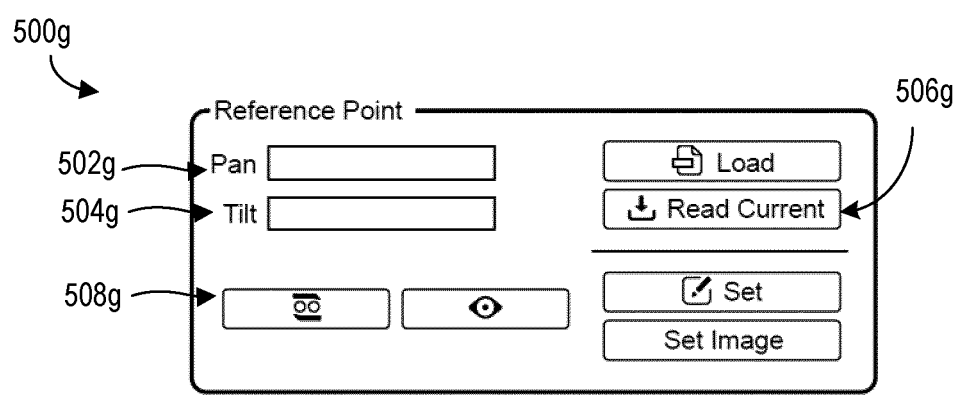
FIG. 5G is an example embodiment of a graphical user interface for inserting reference region camera motor coordinates.
Figure 5H:
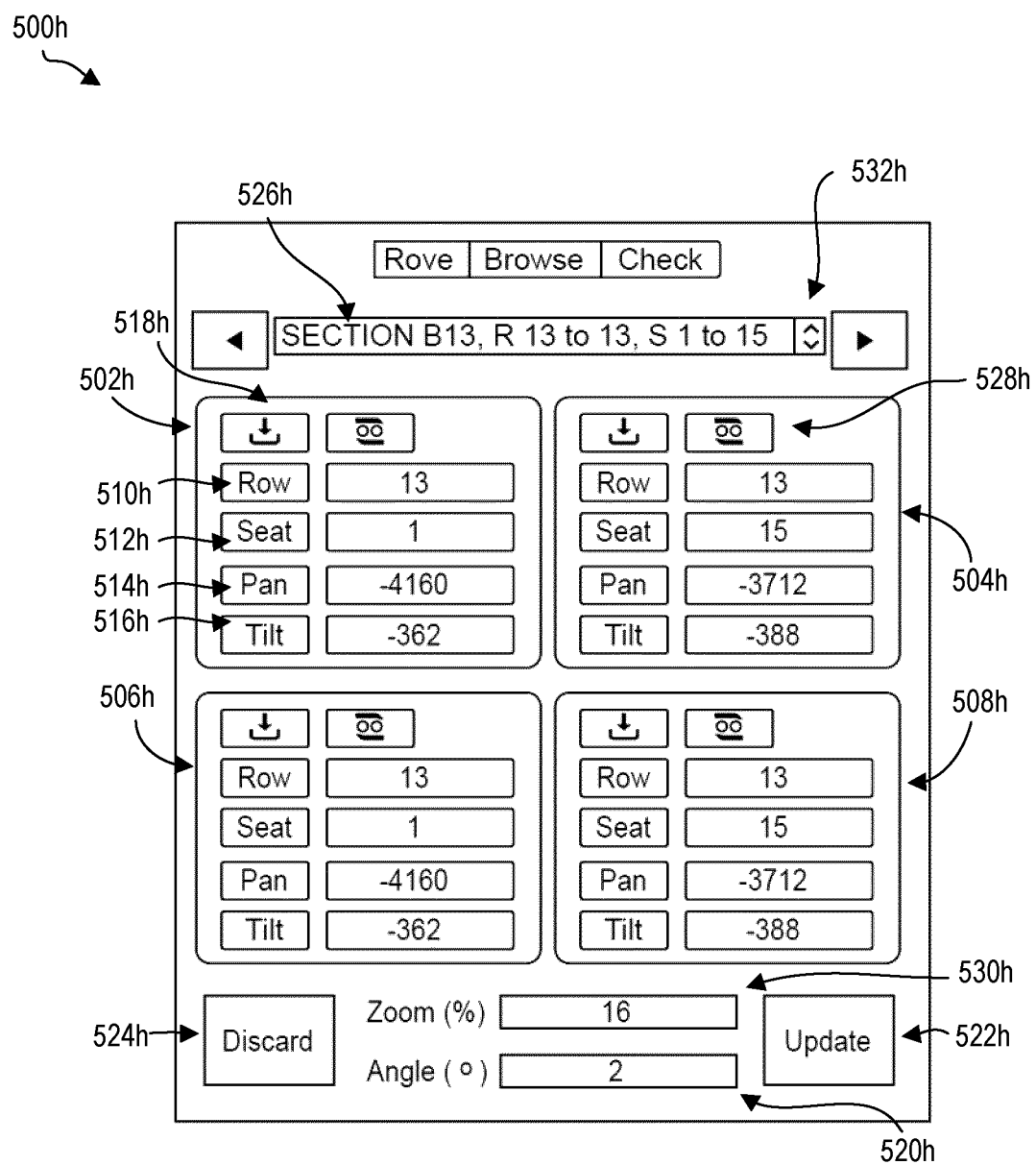
FIG. 5H is an example embodiment of a graphical user interface for inserting camera configuration settings for a spatial region in a venue.
Figure 5J:
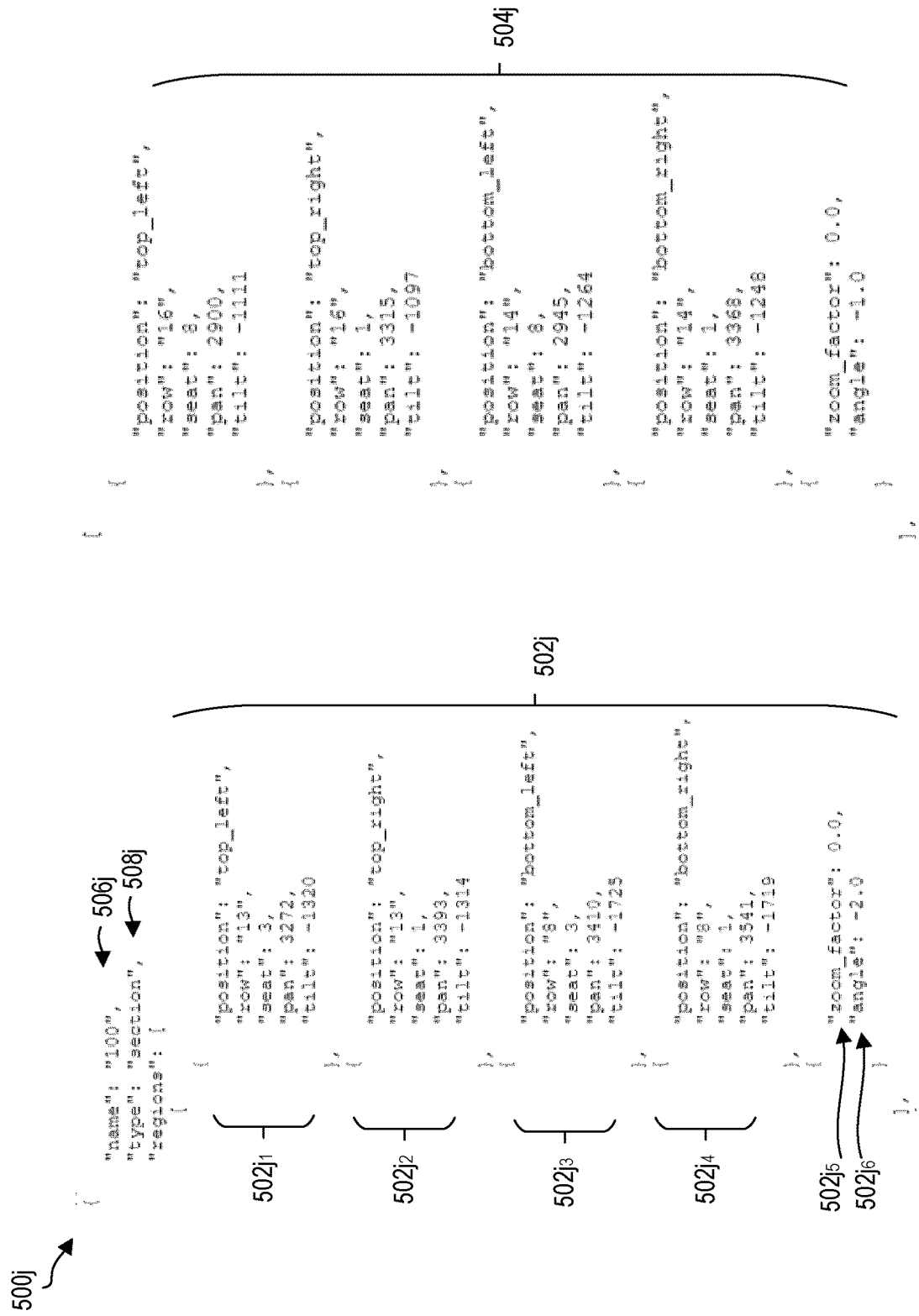
FIG. 5J is an example embodiment of a configuration file for camera motor coordinates for one or more spatial regions.
Figure 5K:
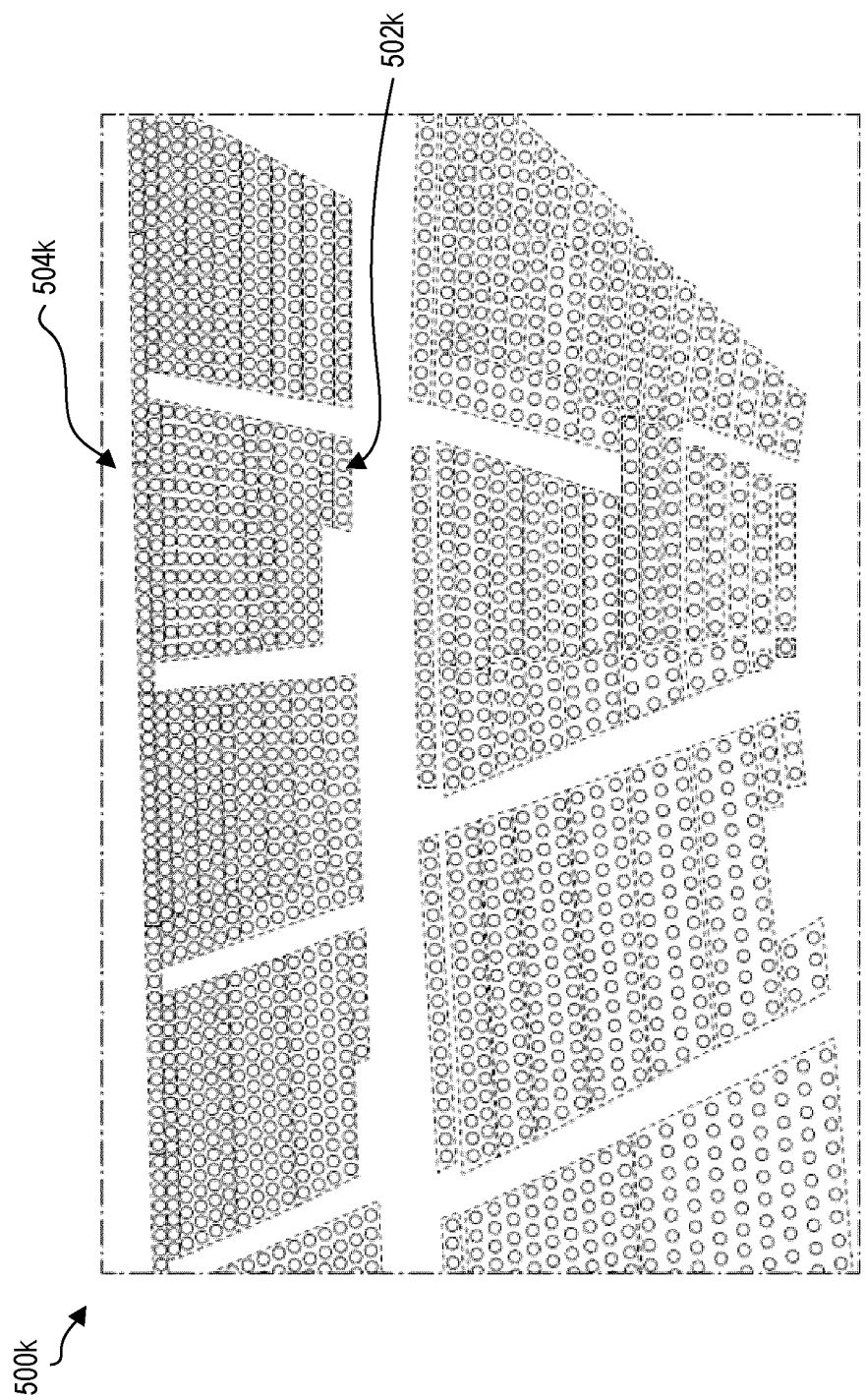
FIG. 5K is a schematic illustration of a plurality of spatial regions overlayed over an image of a venue.

FIG. 5K shows an example illustration of many quadrilateral-shaped spatial regions over a larger venue area. As shown, the geometrical properties of each spatial region can be selected to accommodate discontinuities in the spectator seats. For example, groups of inset seats (i.e., 502*k*) may be assigned to different spatial regions than more extended seating areas (i.e., 504*k*).

Figure 5N:
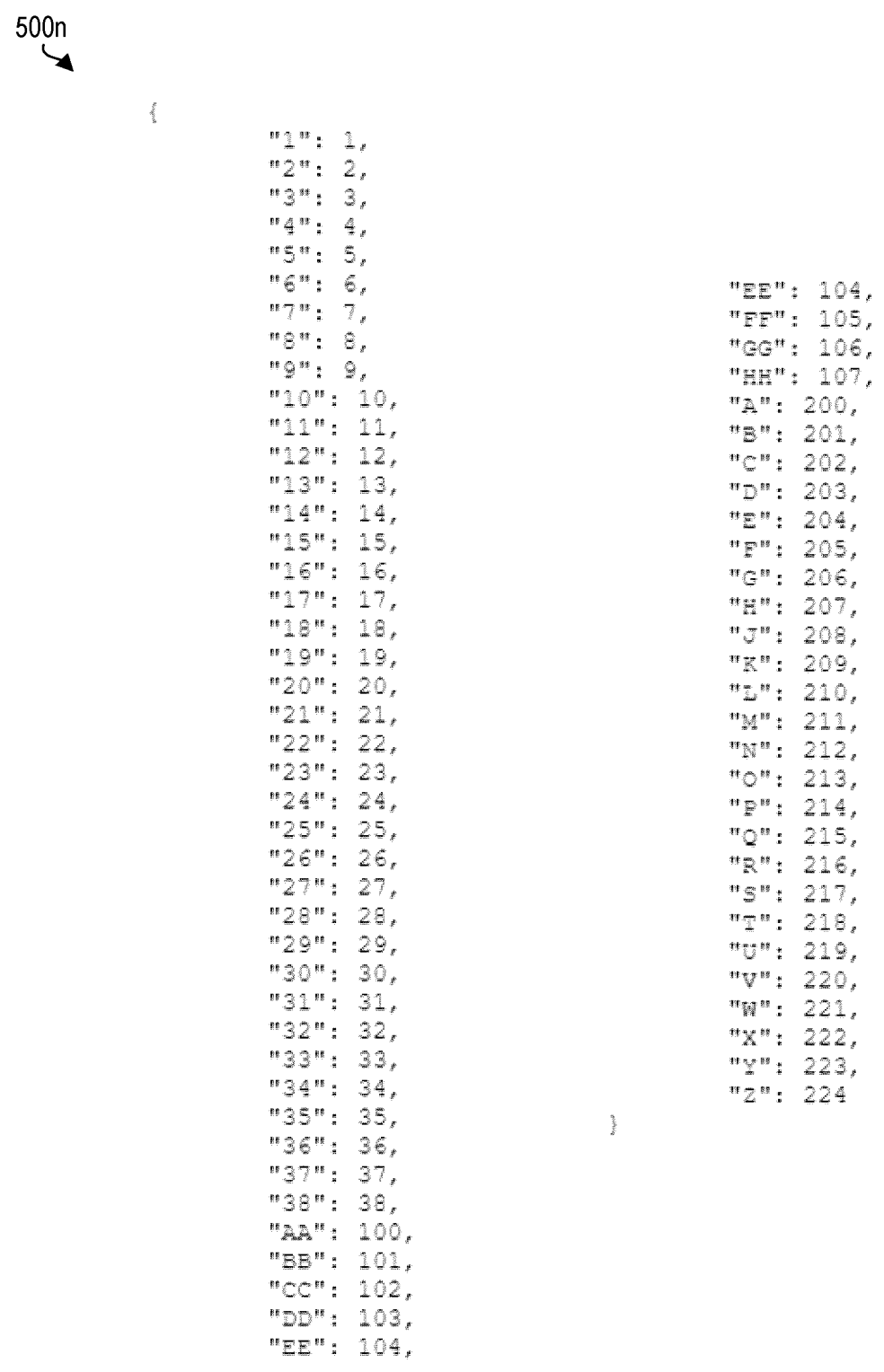

In the example context of seating areas in stadiums and venues, the corners of each spatial region in the stadium (or theater) venue may be defined by the corner seat numbers. For example, region 500*e* in FIG. 5E can be defined as the region located between seats 1 and 10, and rows 1 and 10. In various cases, to accommodate for unique seat numbering nomenclature for different venues, a seating manifest can be available before handed, and/or a row dictionary (i.e., FIG. 5N), to detail the seat numbering layout in the venue.

In some cases, the same spatial region can be used to map each camera in the venue, in each iteration of method 400*a*. In other cases, different spatial regions are identified for each camera.

In some cases, only the spatial regions located within the cameras imaging range can be identified at act 402. Accordingly, areas of the venue located outside of the cameras imaging range may not be necessarily identified at act 402a.

Referring still to FIG. 4A, at 404a, in some embodiments, a camera-specific reference is selected, and can be unique to the particular camera being mapped. The camera-specific reference area can define a center of origin point in the camera's imaging range, and may or may not be located in the camera's center of frame. As explained herein, the reference area can be used to relatively express the camera motor coordinates for each spatial region in the venue. That is, each spatial region may have camera motor coordinates that are expressed relative to the camera motor coordinates of the reference area. As explained, the use of a camera-specific reference may also allow for quickly generating camera-specific maps for proximal unmapped cameras, as well as for re-generating the camera-specific map for the camera being mapped in method 400a if the camera is relocated (or re-installed) in the venue to a new or modified position.

In various example cases, the reference area may be selected to be an area that is unique within the venue, and is otherwise feature rich. For example, this can include an area with sharp edges (e.g., a logo on the wall, or a location where a tag is inserted (i.e., a QR code, bar code, ARTag, ArUco marker, etc)). FIG. 5F shows an example reference area corresponding to the distinct exit label on the exit door. This reference area can be selected because it is visually distinguished from the audience spectator seats being imaged.

At 406a, in embodiments where a reference area is selected, camera motor coordinates can be obtained for the reference area (also referred to herein as the reference camera motor coordinates). The reference camera motor coordinates can comprise the camera's pan, tilt and orientation settings when the camera is oriented to aim at the selected reference area. Act 406a assumes the camera is pre-mounted to its desired installation location in the venue. As used herein, directing or aiming the camera at a given location implies that the location is generally centered (or at least brought into view) within the camera's field of view.

In some cases, the reference camera motor coordinates may be known in advance. In other cases, the reference area must be brought into the field of view of the camera (i.e., as shown by the crosshairs 502f in FIG. 5F) to determine the corresponding camera coordinates.

Directing of the camera to aim the reference area may occur through various methods. In some cases, the camera may be manually directed to aim at the reference area by an operator physically re-adjusting the camera to aim at the reference area. In other cases, the camera may be directed to aim at the reference area through computer-assisted control. For instance, in one example case, an operator of the administrator computer 206 may access a particular camera, via the server 204 (i.e., the server's camera control module 210h). Using the computer terminal, the operator can transmit camera orientation instructions to re-orient the camera to aim at the reference area. For instance, the computer operator may use an input device (i.e., arrow keys, or joy stick) of the computer 206 to transmit re-orientation instructions to the server's camera control module 210h. In turn, the camera control module 210h can transmit control signals to the relevant camera controller 115. As the operator is using the input device (i.e., joystick) to re-orient the camera, the operator may observe a real-time or near real-time media stream of the camera's view (i.e., generated by the server's media stream module 210j) to track the cameras motion and to determine whether the camera is directed to the reference area.

In some other embodiments, to avoid using an input device (i.e., a joy stick) to manually re-adjust the camera position to aim at the reference area—the operator may also access an interface (i.e., on the computer terminal 206) as part of the venue mapping module 210g. The interface may allow the camera to automatically re-position to aim at different areas in the venue based on the operator's selection. For example, the interface may stream on the computer display—i.e., from the media streaming module 210j— image frames of the real-time or near real-time camera view. The operator may observe the media stream, and may note that the desired reference area is located in a left corner of the image frames. Accordingly, the operator may simply "click" (or double click) on the image pixels corresponding to the left area of the image frames, and in turn, the camera will automatically re-position to aim at the selected area. The camera motor coordinates in that position may then be obtained as the reference camera motor coordinates. This, in turn, provides a simplified method for the operator to quickly and automatically re-position the camera to aim at a target area without manual effort of re-positioning the camera.

To allow the operator to re-position the camera by selecting different pixel areas in streamed image frames (i.e., convert pixel area selections to camera motor coordinates for re-positioning the camera)—the camera control module 210h may use pixel to motor conversion equations that rely on one or more of the variable in Table 1.

TABLE 1

Pixel to Camera Motor Coordinates Conversion Variables

| Symbol | Unit | Description | Value |
| --- | --- | --- | --- |
| $\alpha_H$ | degrees | Horizontal field of view | Get the Field of View (FOV) from sensor specification sheet or measured from calibration process. |
| $IMG_W$ | pixels | Width of an image | Read the Width EXIF Tag or read from frame |
| $IMG_H$ | pixels | Height of an image | Read the Height EXIF Tag or read from frame |
| $res_{pan}$ | Seconds arc per position | Pan resolution of pan/tilt unit | Read output of PR command from PTU |
| $\theta_{pan}$ | degrees | Pan resolution in degrees | $\theta_{pan} = res_{pan}/3600$ |
| $res_{tilt}$ | Seconds arc | Tilt resolution of the | Read output from TR |

TABLE 1-continued

Pixel to Camera Motor Coordinates Conversion Variables

| Symbol | Unit | Description | Value |
| --- | --- | --- | --- |
| | per position | pan/tilt unit | command from PTU |
| $\theta_{tilt}$ | Degrees | Tilt resolution in degrees | $\theta_{tilt} = res_{tilt}/3600$ |
| $\mu_H$ | Pixel per step | Conversion between pan steps and horizontal pixels | $\mu_H = (IMG_W/\alpha_H) * \theta_{pan}$ |
| $\mu_V$ | Pixel per step | Conversion between tilt steps and vertical pixels | $\mu_V = \dfrac{\theta_{tilt}}{\theta_{pan}} * \dfrac{IMG_W}{IMG_H} * \mu_H$ |

Once the camera is directed to the reference area, the administrator computer operator can obtain the cameras motor coordinates through a GUI associated with the venue mapping module 210g.

FIG. 5G illustrates an example graphical interface 500g, associated with the venue mapping module 210g, and that may be displayed to the operator on the computer terminal 206. As shown, the graphical interface 500g provides various fields that can be manually or automatically populated, and allow for obtaining the camera motor coordinates for the reference area. For instance, as shown, the interface 500g includes a pan coordinate field 502g and a tilt coordinate field 504g. In some cases, where the operator has knowledge of the reference pan and tilt camera coordinates, the operator can simply manually populate these fields using an input interface of the administrator computer 206. In other cases, the graphical interface 206 can also include a "read current" selection 506g. Clicking on this selection allows the venue mapping module 210g to automatically "grab" the camera motor coordinates for the reference area. For example, this can involve communicating with the camera controller 115 to determine the camera's current pan and tilt coordinates, i.e., assuming the camera is directed to aim at the reference area. In other cases, the camera zoom settings may also be determined for the reference area (not shown in FIG. 5G). For example, the zoom settings can be adjusted to ensure that the camera is highly zoomed into the reference area. This can be done to omit, from the camera's reference view, any other extraneous objects (i.e., spectators seated around the reference area), that may otherwise change as the stadium is filled or emptied. In other words, the zoom can ensure that the camera captures the same reference image view, irrespective of the surrounding changes. In various cases, the zoom may be adjusted optically by the camera, or otherwise by cropping image frames generated by the camera (i.e., as explained herein).

FIG. 5l shows an example output configuration file (i.e., a JSON configuration file) that includes the reference motor coordinate data. The configuration file can be stored on the server memory 210b and/or the respective controller memory 212b. As shown, the configuration file can include a portion 500i which defines the pan and tilt coordinates for camera-specific map. For example, each value expressing a "pan" and "tilt" may express a motor step. Accordingly, in the portion 500i, one step of pan or tilt of the motor corresponds to 0.005 degrees of corresponding pan or tilt change (i.e., also referred to as the motor resolution). Portion 502i defines the stepper motor pan and tilt coordinates for the reference area. Portion 504i shows the definition of the reference area as the "origin point" (i.e., the pan and tilt in portion 502i is expressed as the (0,0) coordinates for the camera-specific map).

At act 408a, once the reference camera motor coordinates are obtained, the operator may then commence mapping the camera for each other spatial region identified at act 402a, and/or otherwise located within the camera's imaging range. Accordingly, at act 408a, the operator can select a given spatial region to map, and can proceed to map each spatial region one by one in turn.

At act 410a, in respect of a selected spatial region, camera configuration settings are obtained for that spatial region. In an example case where the spatial regions comprise quadrilateral-shaped areas, mapping a spatial region may involve obtaining camera motor coordinates for each corner of the quadrilateral-shaped area.

FIG. 5H shows an example graphical user interface 500h—associated with the server's venue mapping module 210g—that can assist in obtaining camera configuration settings for each spatial region.

As shown, the interface 500h includes a plurality of field areas 502h, 504h, 506h and 508h. Each field area 502h-506h is associated with a different corner of a quadrilateral-shaped spatial region that is being mapped. Each field area 502h-506h may include one or more subfields, including subfields 514h, 516h corresponding to the camera motor coordinates for directing the camera at the corresponding spatial region corner. For instance, in the example context of mapping spectator seats in a stadium or theater, the camera motor coordinates 514h, 516h can correspond to camera motor coordinates for directing the camera at a specific seat—or box/suite—that defines the spatial region corner (i.e., as shown in FIG. 5E). In at least some embodiments, directing the camera at a particular seat involves directing the camera at a back seat portion of that seat.

Obtaining the camera motor coordinates 514h, 516—in each field area 502h-506h—can be performed in a manner analogous to that previously explained at act 406a in respect of the reference camera motor coordinates. For example, an operator can manually enter the coordinates into the fields 514h, 516h based on the known camera coordinates for that spatial region corner. In other cases, the operator can manually—or via the computer—control the camera to aim at the spatial region corner. The computer operator may then "grab" the camera motor coordinates for that spatial region corner by clicking on the "get position" button 518h in each respective field area 502h-506h.

In various embodiments, the camera motor coordinates captured in respect of each spatial region corner 502h-506h may be expressed in absolute coordinates. In other cases, the camera motor coordinates can be expressed in relative coordinates, and with reference to the camera motor coordinates for the reference area obtained at act 406a (i.e., where the reference area was selected at act 404a and the reference motor coordinates were obtained at act 406a). In other words, the camera motor coordinates for the reference area may be considered as the origin point (i.e., 0 pan, 0 tilt), and the camera motor coordinates for each spatial region corner can be expressed in relative terms to that origin point (i.e., by adding or subtracting the absolute motor coordinates of a spatial region corner from the absolute camera motor coordinates of the reference area). In this manner, a negative pan coordinate can correspond to a spatial region corner that is left of the reference area, and a positive pan coordinate can correspond to a spatial region corner that is right of the reference area. Similarly, a positive tilt coordinate can correspond to a spatial region corner that vertically above the reference area, and a negative tilt coordinate can correspond to a spatial region corner that is vertically below the reference area.

The graphic interface 500h can also include, in respect of each field area 502h-506h, one or more fields 510h, 512h identifying the position of the spatial region corner. For instance, in the example embodiment of mapping a stadium or theater, the position of the spatial region corners in fields 510h, 512h can correspond to the seat numbers that are aligned with each spatial region corner (i.e., as shown in FIG. 5E). In some cases, the computer operator can manually populate these fields in respect of the known seat numbers for each spatial region. The operator can also populate information about the section area where these seats are located (i.e., 502a, 504 in FIG. 5A).

In respect of each spatial region, the interface 500h can also include a zoom field 530h, in which a desired zoom for that spatial region is specified. For instance, in the example of FIG. 5H, the operator may specify a zoom of 16%. Accordingly, when the camera aims at the spatial region, the cameras zoom is automatically calibrated to 16% zoom. In various cases, the zoom can be calibrated based on the distance of the spatial region from the camera's installation position. For example, if the spatial region is more distally located from the known camera position, a greater zoom value can be selected, and vice-versa. Similarly, the interface 500h can include a rotation angle field 520h to specify the known angle orientation of the camera when directed to that spatial region. As explained herein, the angle 502h can be used by the media processing module 210k to modify media generated from the camera 105, while the camera 105 is directed to a spatial region. In particular, owing to the angular position of the camera, media generated by the camera may appear angled to the user. Accordingly, prior to transmitting any media to the user device 202 (i.e., captured images, image bursts, short video clips, or a media feed from the media streaming module 210h), the media processing module 210k can digitally adjust the images or image frames to compensate for the angular offset in field 502h (i.e., such that the image is rotated to be levelled, or the image appears to have been taken "center on").

In some cases, the zoom 520h and the rotation angle 520h may also be specified in respect of each corner of the spatial region 502h-506h.

In other example applications where the venue being mapped includes, bowling alleys, curling lanes or theatres or courses having a plurality of "boxes" and "suites", each spatial region may correspond, for example, to a single bowling alley lane, curling lane, box or suit. In these cases, the spatial region may have only a single set of camera motor coordinates, corresponding to the motor coordinates required to direct the camera at the respective region (i.e., bowling alley lane, curling lane, box, suite, etc, as the case may be). In other words, there may not be separate camera motor coordinates for each corner of the spatial region (or otherwise the camera motor coordinates may be identical for each corner of the spatial region).

Referring back to FIG. 4A, once the camera configuration settings are determined for a spatial region (i.e., one or more camera motor coordinates, as well as rotation, zoom, etc.), then at 412a, a map node is generated for that spatial region.

The generated map node can include all of the camera configuration settings determined at act 410a for that spatial region. For example, as shown in FIG. 5J, the camera configuration settings may be stored (i.e., in the server memory) in a configuration file as for example in a JSON API format or a CSV format. In other cases, the map node (or any part thereof) can be stored on the respective camera controller 105 (i.e., controller 212b). As shown, in the example of FIG. 5J, the JSON API format can include different code segments 502j, 504j corresponding to each map node in association with each mapped spatial region. For instance, the map node 502j includes the camera configuration settings for each of four corners of the spatial region $502j_1$-$502j_4$ (i.e., top left, top right, bottom left and bottom right). In the context of a stadium or theater, the camera configuration settings for each corner also includes an identifier of the corresponding seat (i.e., row and seat number) that is aligned with that spatial region corner. The map node 502j also include the zoom factor $502j_5$ and the camera angle $502j_6$. Where a stadium or theater is being mapped, the JSON API file may also group together map nodes associated with the same seating section (i.e., 502a, 504a of FIG. 5A). For example, the map nodes 502j and 504j are grouped under the headers 508j, 506j referring to seating section 100. In this manner, the map nodes may be categorized and referenced relative to their corresponding seating sections.

Continuing reference to FIG. 4A, at act 414a, it is determined whether all desired spatial regions are mapped. If not, the method 400a may return to act 408a, and a different spatial region is selected for mapping. The method 400a may then re-iterate until all desired spatial regions have been mapped.

Otherwise, at act 416a, if all spatial regions have been determined to be mapped, then a camera-specific venue map is generated which includes one or more map nodes, each map node comprising camera configuration settings in association with a different mapped spatial region in the venue.

In some embodiments, an operator may want to verify that the camera-specific map was generated correctly. Accordingly, at act 418a, the camera-specific map can be validated. For example, the operator may want to ensure that each spatial region has corners that are correctly aligned with their desired locations (i.e., a seat in the venue), or otherwise, that there are no overlapping spatial regions.

In various cases, in the example context of a stadium or theater being mapped, the verification tests can include corner checks and completeness checks.

The corner check can be used to determine the positional accuracy of the map—or in other words, that the spatial region corners are correctly aligned with the desired seat (or box/suite) locations. In various cases, the venue mapping module 210g may allow the operator to perform the corner checks. For example, the venue mapping module 210g may present the graphical interface 500h to an administrator computer 206 in communication with the server 204. The computer operator may use the navigation bar 532h to filter between different mapped spatial regions. Once selected, the venue mapping program 210g will retrieve the relevant camera configuration settings in association with the corresponding map node. In turn, the interface 500h will present the camera configuration settings for that spatial region. For each spatial region corner in the interface 500h, there may be a "GO" button that, once selected, will automatically control the relevant camera to aim at the corresponding spatial region corner (i.e., the seat aligned with the spatial region corner). For example, the venue mapping module 210g can cooperate with the camera control module 210h, such that the camera control module 210h can transmit the camera motor coordinates, that are populated in each field area 502h-508h, to the camera controller 115. In other embodiments, the venue mapping module 210g may simply automate the camera to aim at each mapped spatial region (or spatial region corner) using the recorded camera motor coordinates for that spatial region or spatial region corner, and the camera can automatically capture an image of each mapped region or corner. The captured images can then be automatically labelled with the corresponding spatial region (or spatial region corner) being imaged. In this manner, an operator—i.e., of the computer terminal 206—may simply review the captured and labelled images to ensure positional accuracy.

Once the camera controller 115 has adjusted the direction aim of the camera, the operator may observe the camera to determine whether it is correctly directed at the desired location corresponding to the correct spatial region corner (i.e., by observing the camera screen). If an error is observed in the camera position, the camera position can be corrected to the new position and new camera coordinates may be entered into the interface 500h (or otherwise captured using the "get position" button 518h). The update button 522h may be selected to update the configuration file corresponding to that map node. In other cases, the entire spatial region can be discarded via the discard option 524h.

Another verification test that can be completed at act 418a is a completeness test. For a completeness test, the venue mapping module 210g may generate a visualized map of all spatial regions in the venue for the benefit of the computer terminal 206 operator. For example, the computer terminal 206—in communication with the server 204—may receive a rendered visual map as shown in FIG. 5K (i.e., map 500k). In this case, the venue mapping module 210h may retrieve the spatial region definitions (i.e., the seat locations) from each map node in the camera-specific map, and visualize each spatial region using a different visual indicia (i.e., different colors, bounded boxes, etc.). In this manner, the operator may confirm that the spatial regions do not inadvertently overlap, or that a region is not invertedly shifted, or that a spatial region corner is misplaced. If an error is detected, then the operator may correct the camera configuration settings for a given spatial region as explained previously. In another example case, the completeness check can include comparing a seat manifest of the venue with a number of mapped seats, to ensure that all seats are mapped. In various cases, the comparison can occur on a per venue or per section basis.

As stated, method 400a may be iterated for each camera in the venue to generate a camera-specific venue map in association with each camera. Each camera-specific map can be stored (i.e., on the server memory 210b) in association with a camera identifier (i.e., "cam1") that indicates the camera associated with the camera-specific venue map.

Figure 4B:
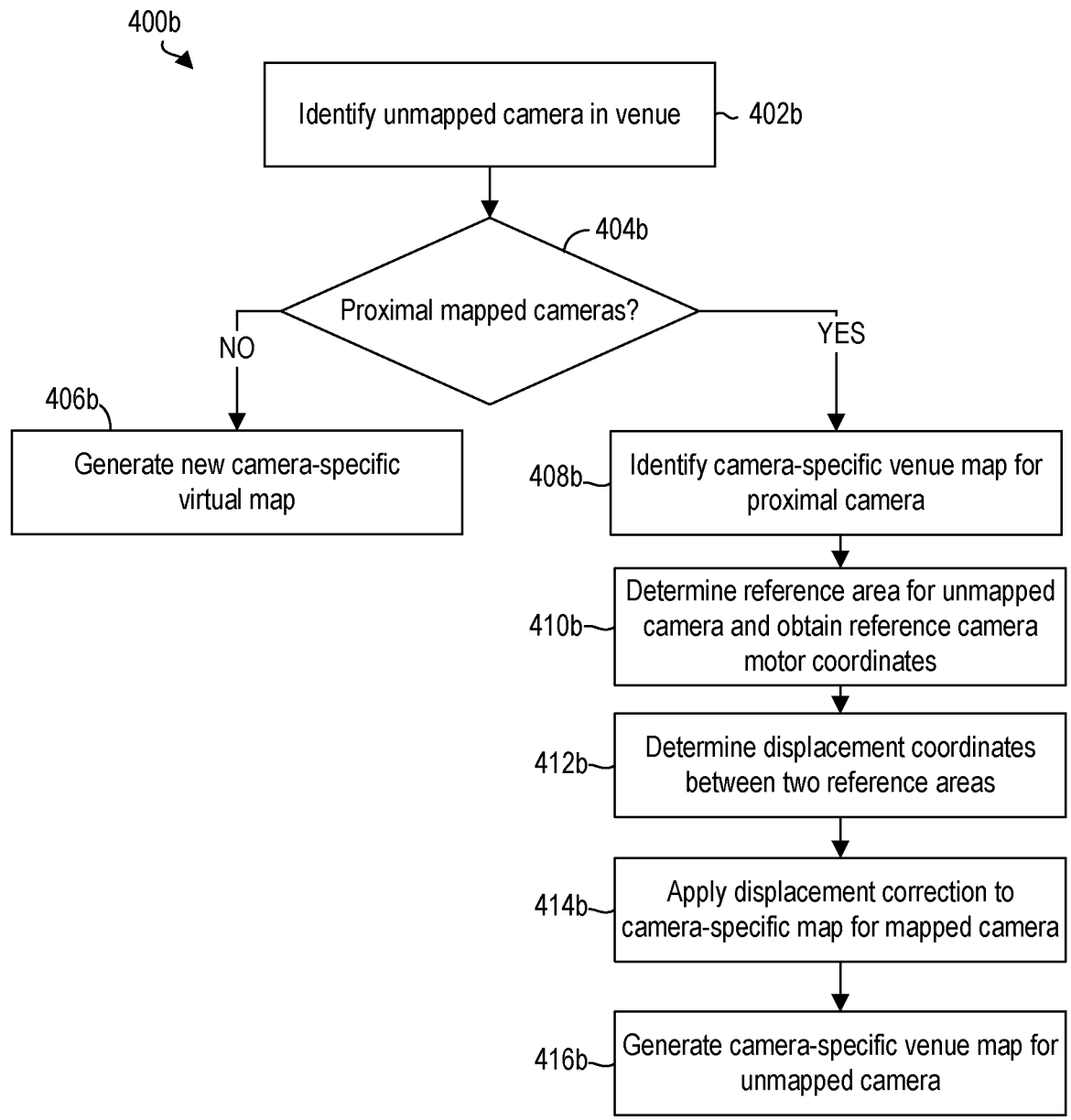
FIG. 4B is an example embodiment of a simplified method for generating camera-specific venue maps, in accordance with some other embodiments.

Reference is now made to FIG. 4B, which shows an example embodiment of a simplified method 400b for generating camera-specific venue maps. The method 400b may be used, in some cases, as an alternative to method 400a for cameras that are located in close proximity, and where at least one of the cameras has already been mapped in accordance with method 400a.

Figure 6:
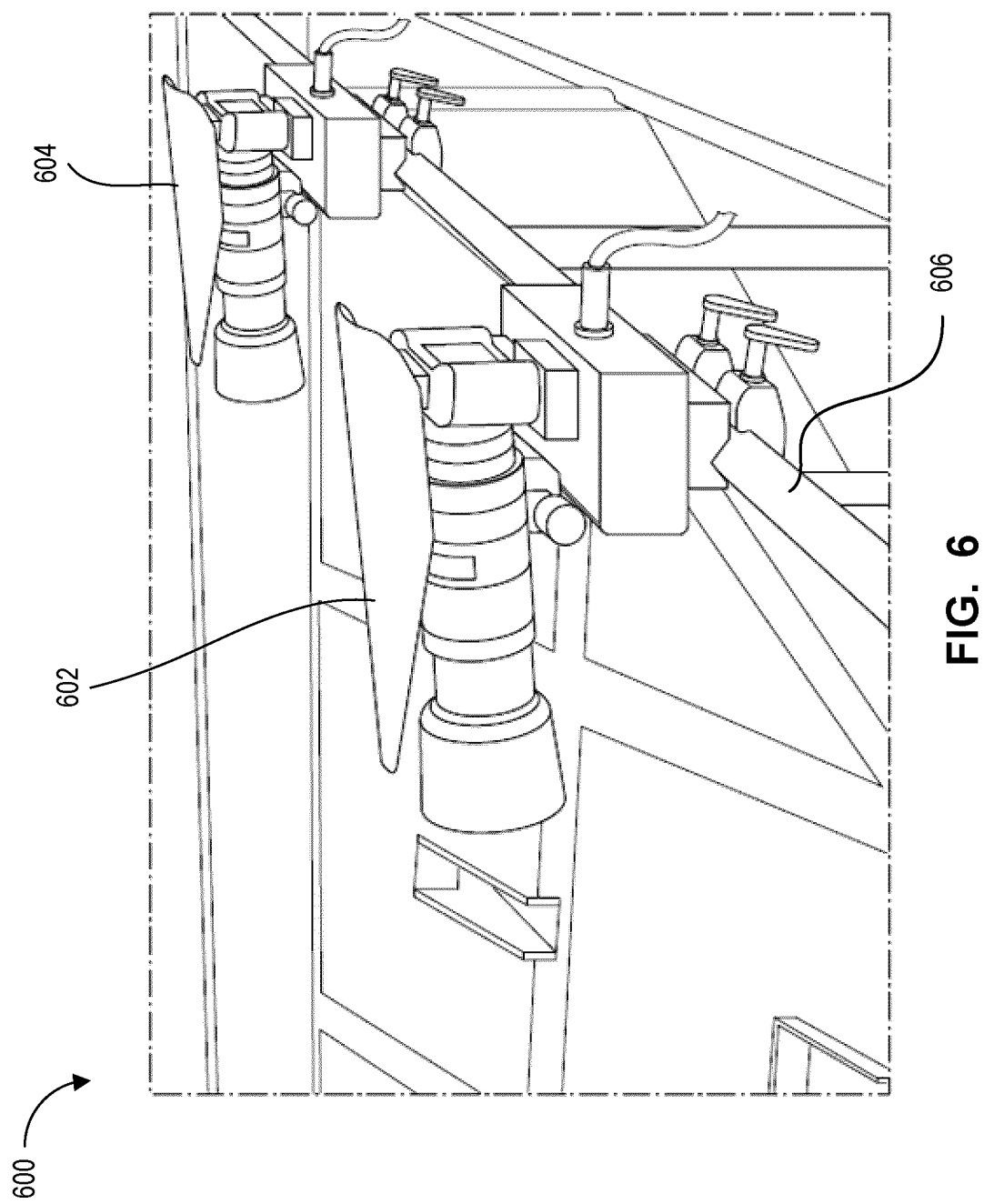
FIG. 6 is a schematic illustration of proximally distanced cameras in a venue.

At act 402b, an unmapped camera is identified (i.e., by an operator). At act 404b, the operator may determine if there are one or more proximal cameras that have already been mapped. A proximal camera may be one that is located within a pre-defined spatial radius of the unmapped camera (i.e., approximately 10 meters). For example, FIG. 6 shows a schematic illustration of two proximal cameras 602 and 604 that are installed along the same rail 606. In this example, the camera 602 may have been mapped (i.e., includes an associated camera-specific map), but the camera 604 may not yet have been mapped.

If it is determined that there are no proximal cameras at act 406b, then the operator may generate a new camera-specific map for the unmapped camera (i.e., in accordance with method 400a). Otherwise, if at least one camera has been identified that is within the proximal range, then the method may proceed to act 408b.

At act 408b, the camera-specific map associated with the proximal mapped camera is identified. For example, using the computer terminal 206, in communication with the server 204, the operator can access the venue mapping module 210g and insert a camera identifier to pull up the corresponding camera-specific map for the proximal mapped camera.

At act 410b, a reference area is selected for the unmapped camera. For example, this may occur in a manner analogous to act 404a of method 400a. The reference area selected for the unmapped camera may be the same area, or a different area, than the reference area selected for the proximal mapped camera. The operator may then obtain reference camera motor coordinates (i.e., pan, tilt, and in some cases, rotation) for the unmapped camera in a manner analogous to act 406a of method 400a.

At act 412b, displacement motor coordinates are determined as between the reference motor coordinates for the proximal mapped camera, and the unmapped camera. That is, the difference between each camera's reference motor coordinates (i.e., pan, tilt and rotation) is identified to determine the positional offset of the unmapped camera relative to the proximal mapped camera.

At act 414b, once the displacement (or offset) motor coordinates are determined, the displacement motor coordinates are applied to each map node (i.e., each camera motor coordinate in each spatial region defined by a map node) of the camera-specific map corresponding to the proximal mapped camera. This, in turn, generates, at act 416b, a new camera-specific venue map associated with the unmapped camera.

Accordingly, the method 400b allows for an expedited method for generating new camera-specific venue maps by applying an offset correction using a camera-specific map of a proximal mapped camera.

In various cases, a similar method can be used if a mapped camera is re-positioned in the venue. For example, if a mapped camera is re-positioned in the venue—new reference camera motor coordinates can be determined, and the camera-specific map can be quickly re-generated using the displacement motor coordinates as between the camera's old reference coordinates and new reference coordinates (i.e., to avoid remapping the camera in accordance with method 400a).

In some cases, where a camera is re-positioned in the venue, the reference image can be re-located by the venue mapping module 210g. For example, the camera 105 may be controlled to scan the venue, and the image frames generated by the camera can be analyzed (i.e., by the media processing module 210k) to identify an image area having image features corresponding to the known images features of the previous image frame. In other cases, the scanning operation may be routinely (or intermittently) performed to ensure that the reference image area has not shifted. Reference is now made to FIG. 5L, which shows example camera-specific summary data 500l that may be generated by venue mapping module 210g. The venue mapping module 210g may generate the summary data 500L by parsing data in each camera-specific map. In various cases, the summary data 500l may provide a quick reference for the operator of an administrator computer 206.

As shown, in respect of each mapped camera in the venue, the summary data 500l can include information about the number of mapped sections 502l, the number of mapped boxes 504l, the number of suites 506l, the number of venue custom types 508l, the number of mapped regions 510l, the number of mapped seats 512l, the reference pan coordinate 514l, the reference tilt coordinate 516l, the maximum zoom 518l, the average zoom 520l, the minimum zoom 522l, the maximum camera angle 528l, the minimum camera angle 528l, the maximum camera pan 430l, the minimum camera pan 523l, the maximum camera tilt 534l and/or the minimum camera tilt 536l.

Reference is now made to FIG. 5M, which shows another example embodiment of parsed mapping data 500m that may be generated, for example, by venue mapping module 210g.

As shown, the parsed mapping data 500m can include—in respect of each camera—data about the max and min range for each camera's mapped area. For example, in the context of mapping a stadium or theater, the parsed mapping data 500m can include one or more columns including a camera identifier 502m, a seat type 504m and a section 506m. For each section 506m (i.e., rows 518m, 520m), the parsed mapping file 500m can include the minimum row 508m that was mapped, the maximum row 510m that was mapped, the minimum seat that was mapped 512m, and the maximum seat 516 that was mapped.

As explained herein, the parsed mapping data 500m can be used to assign a camera in response to receiving a media capture request. For example, the camera control module 210h can identify a target location associated with the media capture request (i.e., a section number, and a row and seat number), and may identify—based on the parsed mapping data 500m for each camera—a camera having a suitable maximum and minimum row and seat range, for a given seating section, that includes the target location.

Figure 7A:
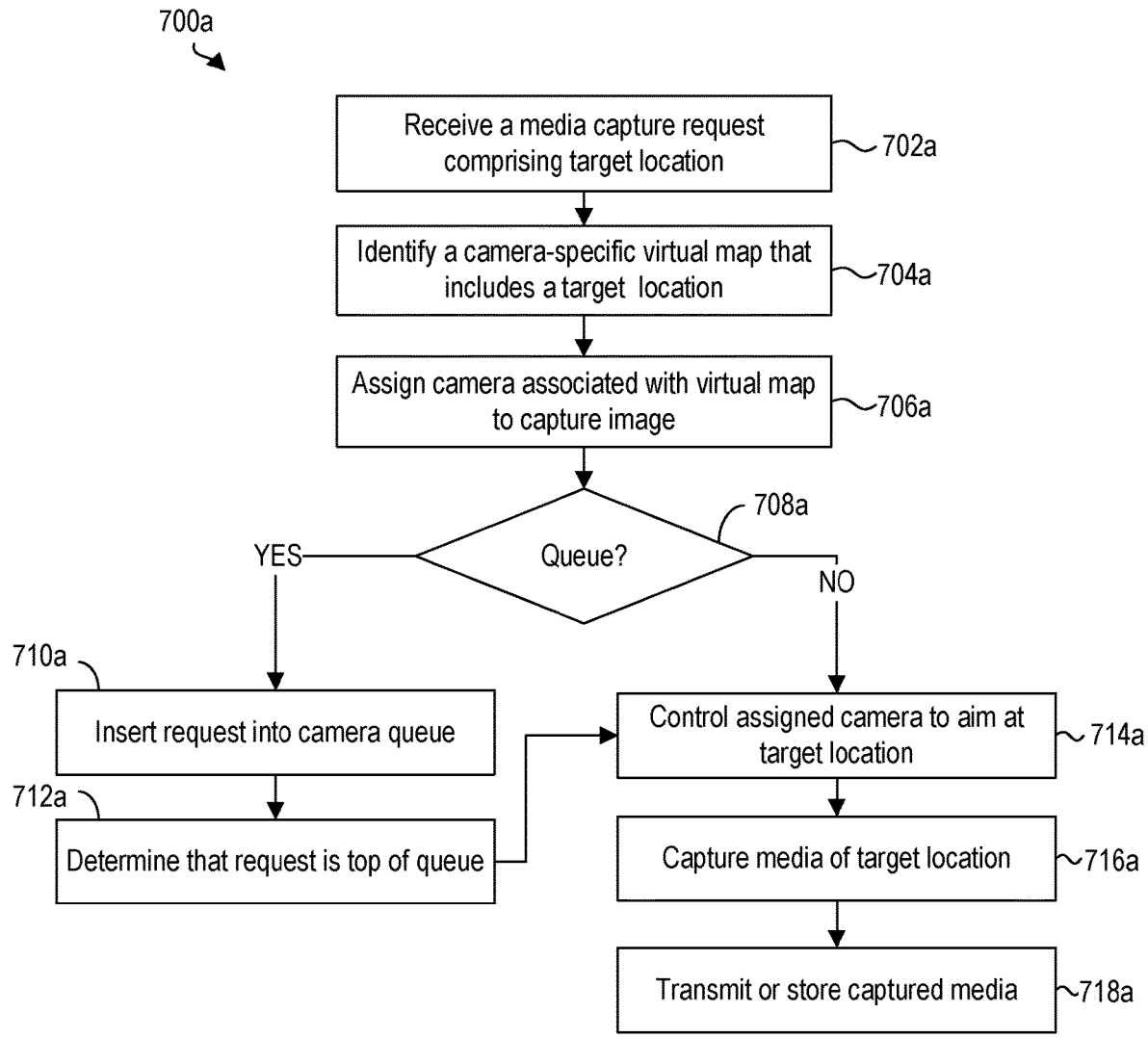
FIG. 7A an example embodiment of a method for capturing media of target locations in a venue, in accordance with some embodiments.

Reference is now made to FIG. 7A, which shows an example embodiment of a method 700a for capturing media of target locations in a venue, in accordance with some embodiments. Method 700a can correspond, for example, to acts 304 to 306 of method 300 of FIG. 3.

At act 702a, the server 204 may receive a media capture request for capturing a media (i.e., photographs, photo bursts or video clips). For example, the media capture request can be received from one or more user devices 202 associated, for example, with venue spectators or event participants (i.e., bowlers, curlers and golfers). In various cases, as explained herein, a user may transmit the media capture request via the user application 210g located on the user device, and the request may be received by the server's user application module 210i. In other cases, the media capture request may not be received from an event attendee or event participant, but rather—for example—from a venue personnel. For example, security personnel may desire to aim the camera at a particular venue location, and accordingly may transmit a request through a security computer (or any other computing device including, for example, cellphones or tablets). In still yet other cases, the media capture request may be received from an individual located remotely from the venue.

In various embodiments, the media capture request can include an indication of the target location for capturing the media. For example, in a stadium or theater—the target location can correspond to one or more seats, boxes or suits in the venue. In another example case, where the venue is a bowling alley, the target location can correspond to a particular bowling alley lane (i.e., 502a-510b in FIG. 5B). In still another example case, where the venue is a mini-golf course, the target location can correspond to a particular hole or green (i.e., 502c-504c in FIG. 5C). In still other example cases, the target location can correspond to a golf bay in a golf driving range, or a box in a Topgolf® course where the device user is located.

In various cases, the media capture request can also include an indication of the type of media to capture. In other cases, all media capture requests may be pre-configured with the same type of media to capture.

At act 704a, the camera control module 210h—i.e., located on the server memory 204b—can identify a camera having an associated camera-specific virtual map that includes a mapped imaging range that covers the target location.

For example, the camera control module 210h can access parsed mapping data (i.e., parsed mapping data 500m of FIG. 5M) for the one or more mapped cameras and can identify a camera having a mapped range that includes the target location.

For example, in FIG. 5M—in the context of a stadium or theater—the camera control module 210h can identify the seating section for the target seat in the stadium (i.e., sections 4-7), and can then initially identify one or more cameras having a mapped range that covers that seating section. For those cameras, the camera control module 210h can further identify any cameras that have a minimum and maximum row range that include the row associated with the target location, as well as maximum and minimum seat range that also includes the target location. In some cases, the camera control program 210g may consult a pre-stored seating manifest of the venue (i.e., row dictionary 500n of FIG. 5N) to determine which rows and seats are located within which ranges, based on the unique seat numbering scheme of that venue.

At act 706a, once the camera control program 210h has identified a camera having a suitable mapped range, the camera control program 210g can assign that camera to capture the requested media.

At act 708a, once the camera is assigned—the camera control module 210h can determine if there is a waiting queue for that camera. For example, the camera control module 210h can maintain and access a list queue for all media capture requests that are assigned to a specific camera, i.e., in order the requests were received.

At act 710a, if a queue is determined to exist, the media capture request is inserted into the camera waiting queue. At a subsequent point in time, at 712a, it may be determined that the request is front of the queue, in which case the method may proceed to act 714a.

At act 714a, if it is determined that there is no queue at act 708a, or otherwise, that the request is now at the top of the queue—the camera control program 210h may transmit a command to the camera controller 115 associated with the assigned camera to aim at the target location. Act 714*a* is explained in further detail with reference to method 700*c* of FIG. 7C.

At act 716*a*, once the camera has adjusted to aim at the target location, the camera may automatically capture a media of the target location. In other cases, rather than automatically capturing a media of the target location—once the camera is directed at the target location, the camera controller 115 may initially transmit a signal to the server 204 indicating that the camera is now aimed at the target location. In return, the camera control module 210*h* may automatically send a return signal instructing to the camera controller 115 to capture a media of the target location.

At act 718*a*, the captured media may be transmitted from the camera controller 115 to the server 204. The captured media may then be received by the server 204 and further transmitted back to the requesting user device 202 via the user application module 210*i*. In other cases, the media capture may be stored on the server memory 210*b* and transmitted to the user device 202 at a subsequent point in time.

In various cases, the system may include functionality to ensure that the system is not being abused. For example, the server's user application module 210*i* can identify the number of unique requests received from a given user device in a given day or event (i.e., the number of media requests having unique target locations) to ensure that the same objects are re-appearing in each captured media, i.e., same human faces. If the server 204 receives more than a pre-defined number of unique requests (i.e., more than three requests), the user device may be flagged or temporarily banned, as this may indicate that the user is attempting to capture media of different target locations that include other individuals than themselves (i.e., using the media capture request feature to snoop on other venue attendees). In other cases, each time a user device makes a media capture request, the media processing module 210*k* may analyze the captured image to identify one or more target objects (i.e., human faces using face detection algorithms). Each time a media capture request is received from the same user device, the media processing module 210*k* can ensure that the same objects are re-appearing in each captured image (i.e., the same faces). If each image capture includes different target objects (i.e., faces), this may indicate a user is abusing the system to capture images of other people in the venue. In other cases, the media capture request can include location data (i.e., from a GPS on the user device 202), and the server 204 may ensure that the requests are being received from within a pre-defined distance around the venue. This can prevent use of the system by unscrupulous remotely-located third-parties.

Figure 7B:
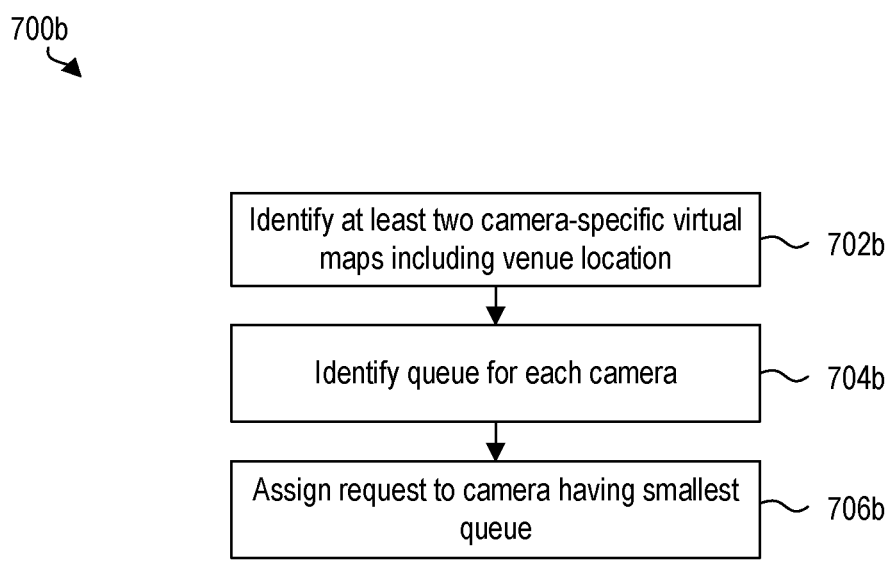
FIG. 7B is an example embodiment of a method for assigning cameras in a venue to a media capture request.

Reference is now made to FIG. 7B, which shows an example embodiment of a method 700*b* for assigning cameras in a venue to a media capture request. Method 700*b* can correspond to act 706*a* of method 700*a*, and can be applied to cases where more than one camera is identified as having coverage of the target location.

At act 702*b*, the camera control module 210*h* can identify two or more cameras having camera-specific virtual maps with a mapping range that includes the target location. For example, there may be two or more cameras in the venue with overlapping mapped ranges. Accordingly, in order to select a camera to assign to the media capture request, at act 704*b* the camera control module 210*h* can identify the waiting queue for each camera. Then at act 706*b*, the camera control module 210*h* can assign the camera having the smallest waiting queue to handle the received media capture request.

Figure 7C:
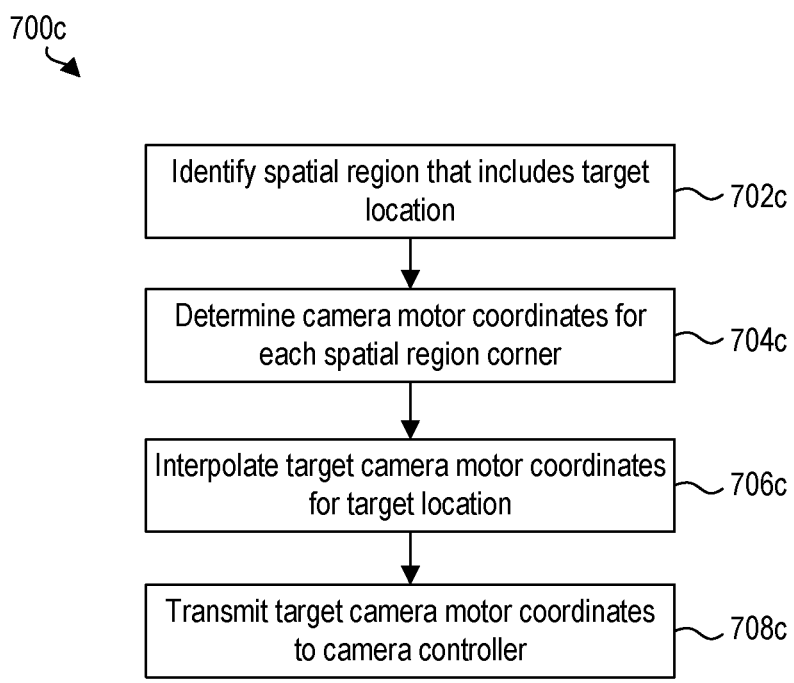
FIG. 7C is an example embodiment of a method for controlling a camera to aim at a target location in a venue.

Reference is now made to FIG. 7C which shows an example embodiment of a method 700*c* for controlling a camera to aim at a target location in a venue. Method 700*c* can correspond to act 714*a* of method 700*a* of FIG. 7A, and can apply in the particular context of stadium or theater venues, or otherwise, venues having spectator and audience seating. Method 700 may be performed, for example, by the server processors 210.

At act 702*c*, for the assigned camera, a spatial region is identified in that camera's camera-specific map that includes (e.g., covers) the target location. For example, in the example context of a stadium or theater, this is performed by identifying a spatial region having corners with seat numbers that cover a range that includes the target location. In various cases, a pre-stored seat manifest (i.e., 500*n* of FIG. 5N) may be referenced to accommodate for the unique seat numbering schemes in various venues.

At act 704*c*, once the correct spatial region is determined, the camera motor coordinates for each spatial region corner (i.e., pan and tilt coordinates) is retrieved from the camera-specific map.

At act 706*c*, the camera motor coordinates for the target location (i.e., pan and tilt coordinates—and in some cases, zoom and rotation) are identified by interpolating between the camera motor coordinates. The motor coordinates used for interpolation can include the pan and tilt for each spatial region corner. In some cases, where the zoom and/or rotation coordinates are also provided for each spatial region corner, zoom and/or rotation coordinates can also be interpolated for the target area. In some cases, the interpolation used involved three operations of linear interpolation per axis are preformed to interpolate within the spatial region (i.e., bilinear interpolation). For example, FIG. 5E shows an example spatial region 500*e* whereby the spatial region corners align with the seat 1, row 10 (502*e*); seat 10, row 10 (504*e*); row 1, seat 1 (506*e*); and row, seat 10 (508*e*). Accordingly, to determine—for example—the camera motor coordinates for (row 5, seat 6), the camera motor coordinates are first linearly interpolated between (row 10, seat 1) and (row 10, seat 10) (i.e., the top left and right corners) to generate the camera motor coordinates for (row 10, seat 6). Further, the camera motor coordinates are linearly interpolated between (row 1, seat 1) and (row 1, seat 10) (i.e., the bottom left and right corners) to generate the camera motor coordinates for (row 1, seat 6). Similarly, the camera motor coordinates are linearly interpolated between (row 10, seat 1) and (row 1, seat 1) (i.e., the top left and bottom left corners) to generate the camera motor coordinates for (row 5, seat 1). Further, the camera motor coordinates are linearly interpolated between (row 10, seat 10) and (row 1, seat 10) (i.e., the top right and bottom right corners) to generate the camera motor coordinates for (row 5, seat 10). Finally, the camera pan motor coordinates for (row 5, seat 6) are determined by interpolating between the determined camera coordinates for (row 5, seat 1) and (row 5, seat 10). Similarly, the camera tilt motor coordinates for (row 5, seat 6) are determined by interpolating between the determined camera coordinates for (row 10, seat 6) and (row 1, seat 6). A similar method can be used to interpolate zoom and rotation, where the zoom and/or rotation are provided for each spatial region corner.

In other cases, rather than bilinear interpolation, any other type of suitable interpolation can be used to determine camera motor coordinates for the target area, including linear, cubic, polynomial, spline, 1D and 2D nearest neighbor and/or bicubic interpolation.

At act 708c, the interpolated camera motor coordinates determined at act 706c are transmitted by the camera control module 210h to the camera controller 115. The camera control module 210h may also transmit other camera configuration settings to the camera controller 115 in association with the target spatial region (i.e., the camera zoom level and rotation).

Figure 7D:
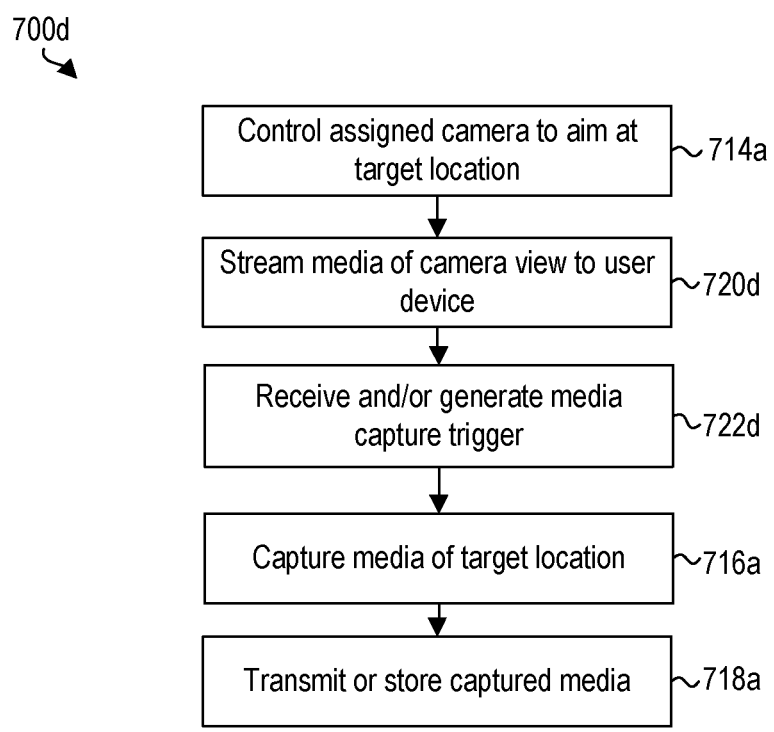
FIG. 7D is another example embodiment of a method for capturing media of target locations in a venue.

In some cases, rather than conducting an interpolation calculation in real-time or near real-time, the method 700c can be performed before hand for each location (i.e., seat) in the venue, and the interpolation output can be stored—for example—in the server memory 210b and/or the controller memory 210b of the camera 105. Accordingly, a database (i.e., a lookup) table of camera motor coordinates for each location in the venue may be readily available and referenced. Reference is now made to FIG. 7D, which shows another example embodiment of a method 700d for capturing media of target locations in a venue, in accordance with some embodiments.

Method 700d is generally analogous to method 700a, and only shows the portion of method 700a as between acts 714a and 718a. In contrast, to the method 700a, the method 700d allows a user to observe the camera view prior to the camera capturing a media of the target location. In this manner, the user (i.e., located in the spectator audience or being an event participant) may, for example, adjust their pose prior to the camera capturing a media.

As shown, after the camera is controlled to aim at the target location at act 714a, at act 720d, the media stream module 210j may receive from the camera controller 115 a live media feed (i.e., a real-time or near real-time feed) of the camera's view of the target location. For example, this live feed may be transmitted automatically by the camera controller 115 once the camera is aimed at the target location. Otherwise, the live feed may be only transmitted once the camera control module 210h transmits instructions to the camera controller 115 to transmit a live feed. The media stream module 210j may then re-transmit that live media feed (or a copy thereof) to the requesting user device. In this manner, the requesting user device may observe the camera's view of the target location (i.e., on the user application 208g), prior to the media being captured.

In various cases, to provided minimum latency for the live media feed, the media streaming module 210j can dynamically adjust the compression ratio (i.e., quality factor) for each transmitted frame. For example, the media streaming module 210j may monitor the size of each transmitted media frame to determine whether it is within a pre-determined range (i.e., 15 KB to 20 KB). In various cases, the size of an image frame may vary based on the scene captured by the camera. If frame size is not within the desired range, the media streaming module 210j can increase (or decrease) the compression ratio to adjust the image frame size to within the desired range. In some cases, the media streaming module 210j may record the size of each transmitted image frame, and may further keep a rolling average count of the average size of previously transmitted frames (i.e., a rolling-average of the last 15 frames transmitted to the user device, or frames transmitted in the previous five seconds). If the rolling average is not within the pre-defined size range, the media streaming module 210j can dynamically adjust the compression ratio to adjust subsequently transmitted frames.

At act 722d, in some cases, the server's user application module 210i can receive a media capture trigger from the requesting user device. For example, once a user is satisfied with their camera pose based on the live stream (i.e., satisfied with their own post, as well as the pose of any other individuals located within the camera view), the user may be able to transmit a request to the server 204, via the user application 208g, for the camera to capture the media. In other cases, once the live stream is transmitted to the user's device, the user may be simply provided a limited countdown time frame before the camera control module 210h automatically controls the camera controller 115 to capture the media. In some other cases, the countdown may be provided once the user device has transmitted the media capture trigger. In various cases, the amount of countdown time may be a function of the user device connection latency, and the camera's operational constraints. For example, after receiving a media trigger request, the camera may require some time to focus on the target location—which can vary, for example, based on the ambient lighting conditions. As well, the time required for the camera to capture a picture can be based on the shot trigger time, if the camera is in a shutter priority mode. In at least some embodiments, the camera control module 210h may keep track of the duration between users' media capture trigger requests and the actual time it takes for the photo to be captured by the camera. This time, which is denoted in Equation (1) as the variable "k", may be measured for every click to create a moving average which can be used to allow the camera to wait the appropriate amount of time before the photo is triggered. Equation (1) provides the equation for determine the countdown time.

$$D \approx K+L \approx C+F+L \qquad (1)$$

wherein D is the countdown time, K is the moving average value of time delta between the photo trigger and the photo captured into the camera memory, L is the latency between the client and the server, F is the time required for the camera to focus, and C is the time the camera takes to close the shutter. Measuring the latency can be performed once a user device 202 has a established a web socket connection (via a window browser) to the server 204. In particular, the socket connection can utilize a keep alive ping/pong routine that allows gaging of the latency that the user is experience. The latency can be calculated as soon as the socket connection is established, and the latency can be averaged at every interval to create a moving average (L).

Figure 7E:
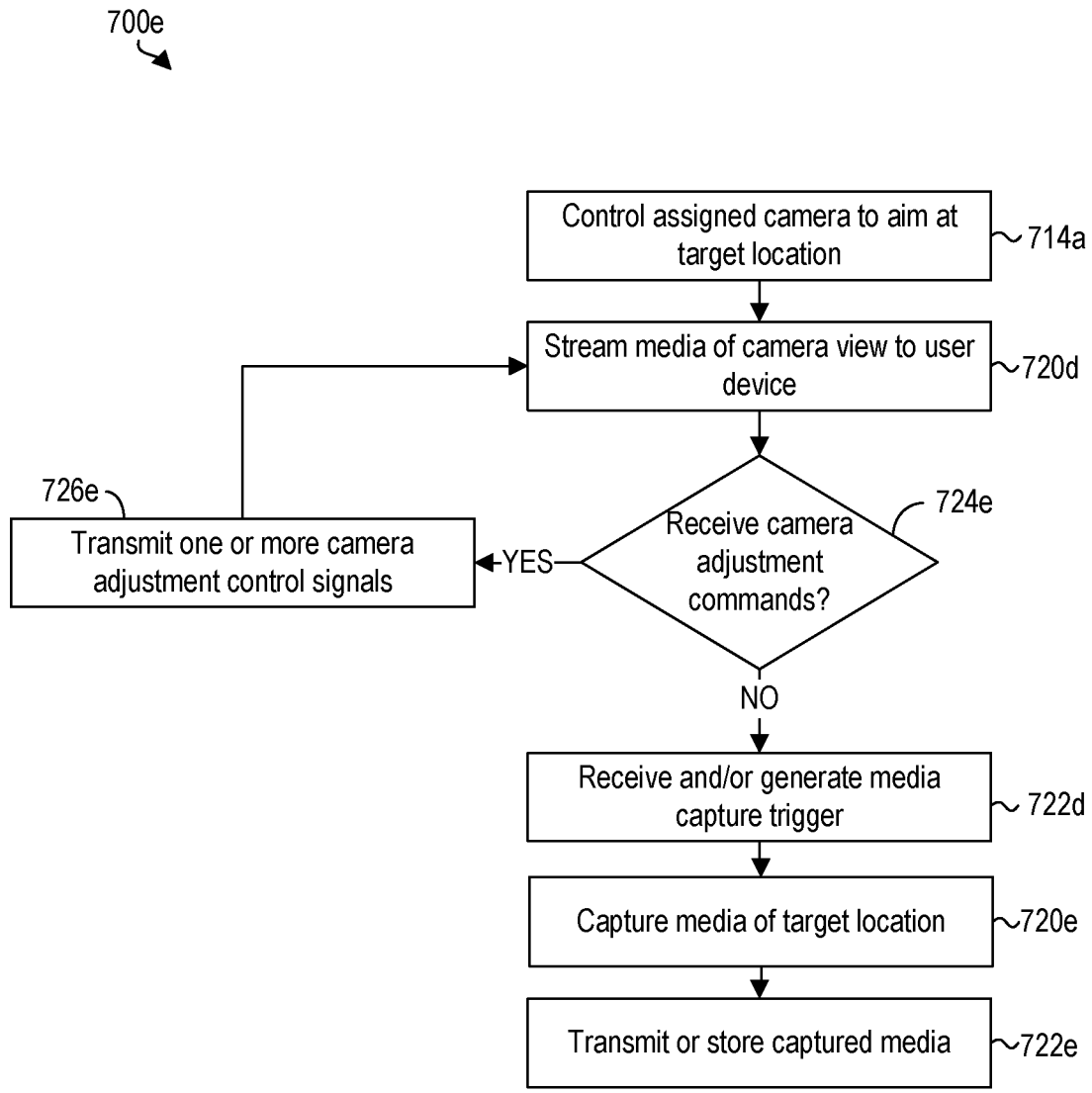
FIG. 7E is still another example embodiment of a method for capturing media of target locations in a venue.

Reference is now made to FIG. 7E, which shows another example embodiment of a method 700e for capturing media of target locations in a venue, in accordance with still some other embodiments.

Method 700e is generally analogous to method 700d, except that method 700e allows a user to request adjustments to the camera view of the target location, after receiving the live camera view at act 720d. This, in turn, allows the user to exert more control on the media being captured. For example, the user may slightly adjust the pan, tilt and zoom settings to generate a more desirable media capture.

As shown, at 724e, the camera control module 210h can determine whether any camera adjustment commands have been received from the user device 110. For example, as explained herein—the user may be able to manipulate the image using a device input interface 208e (i.e., a touchscreen display) of the user device 110. For instance, as provided herein, the user—viewing the media stream on their device display 208d—may use their fingers to scroll left or right to adjust the pan, or scroll up and down to adjust the tilt (or otherwise click on left/right and up/down arrows displayed as part of the user application 208g GUI). The user can also zoom in and out to adjust the camera zoom, as well as adjust the rotation of the image frame. Each of these camera adjustments can be communicated to the server user application module 210*i*.

If no camera adjustment commands are received, then the method 700*e* can proceed to act 722*d*. Otherwise, at 726*e*, the camera control module 210*h* can transmit one or more control signals to the camera controller 115 to effect the desired camera motor coordinates.

At 720*d*, the media stream module 210*j* can receive a live stream back from the camera controller 115 once the camera is controlled in accordance with adjustment control signal. The returned live stream may be referred herein as an adjusted media stream.

The method 700*e* can iterate between acts 720*d*, 702*e* and 704*e* until the user is satisfied with the camera view, as received on their user device. In some embodiments, the user may be given a limited time frame (i.e., a count down timer) to make any necessary adjustments before the media is automatically captured.

Figure 8A:
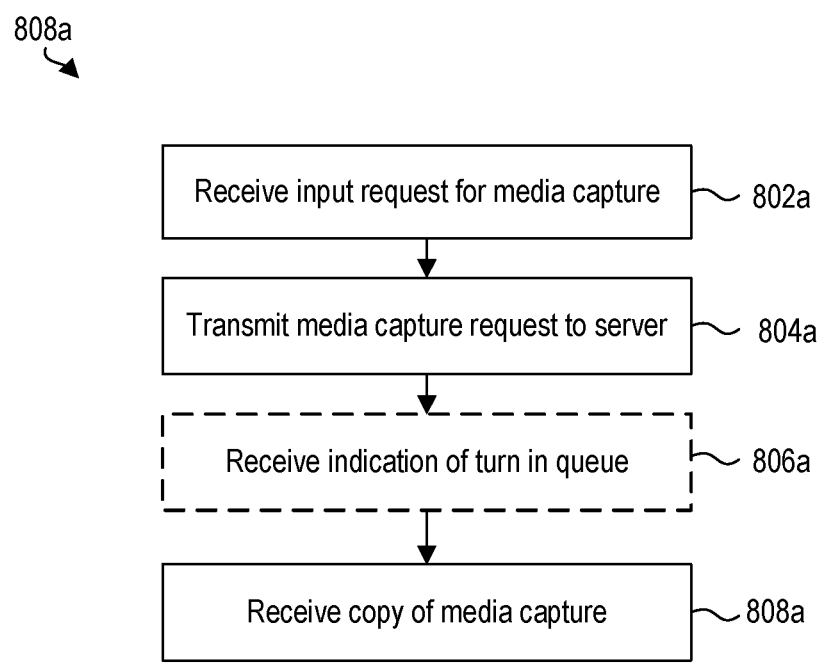
FIG. 8A is an example embodiment of a method for requesting a media capture using a user device.

Reference is now made to FIG. 8A, which shows an example embodiment of a method 800*a* for requesting a media capture using a user device. The method 800 can be performed, for example, using the device processor 208*a* executing the user application 208*g*. Method 800*a* may complement method 700*a*, but from the user device 202 perspective.

At act 802*a*, the user application 208*g* may receive a user input for a media capture request.

Figures 10A, 10B:
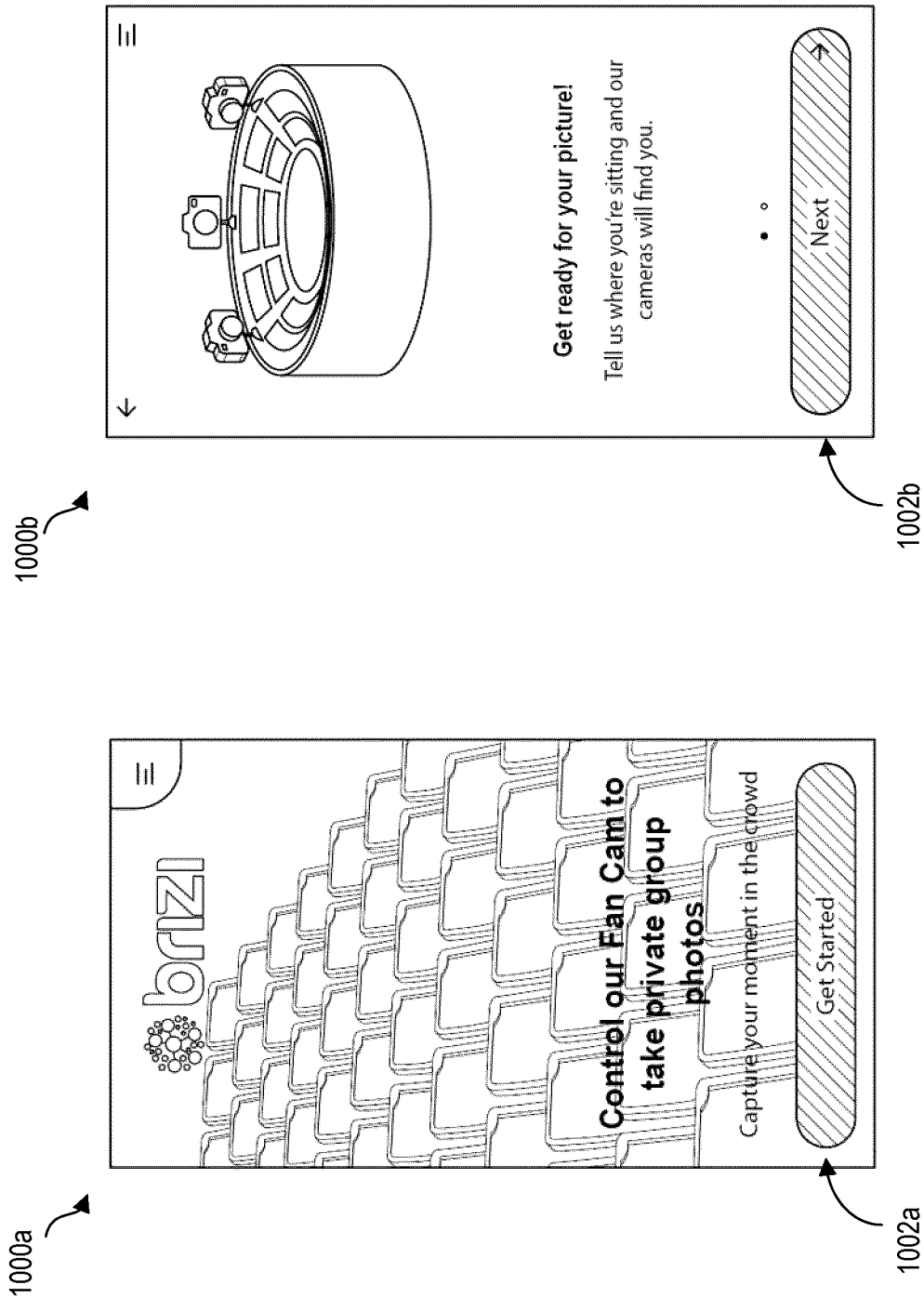

For example, FIG. 10A shows an example graphical user interface (GUI) frame 1000*a* which may be presented by the user application 208*g* on the device display 208*d*. The example in FIG. 10A is provided in the context of a stadium event. In this example, to the user can click on "Get Started" 1002*a* to initiate a media capture request. FIG. 10B illustrates a follow-up frame 1000*b* that is then presented to the user, whereby the user may click on "Next" 1002*b*. Once the user has clicked "Next", one or more additional graphical interface frames may be displayed to the user that look similar to the example graphical interface frame 1000*c* in FIG. 10C. In particular, in FIG. 10C, the user may be provided an option of specifying their section number 1002*c*, row number 1004*c* and seat number 1006*c*. Upon clicking on each one of 1002*c*, 1004*c* and 1006*c*, the user may be provided with a selection of numbers 1008*c* in order to specify the exact section, row and seat number. In some embodiments, prior to the interface frame 1000*c*, the user may also select whether they are seated in a seat, box or suit. The user may then click on "Next" 1010*c* to proceed to the next graphical interface frame. In FIG. 10D, the user may be presented with a summary 1002*d* of their seat location. If the user is satisfied, the user may click on "Let's go" 1004*d*. In clicking on "Let's go" 1004, a media capture request is generated and transmitted to the server 204, whereby the media capture request includes a target location corresponding to the user's seat number.

In other cases, the user application 208*g* may automatically capture the user's seat location either by asking the user to image a visual indicia on the ticket (i.e., a barcode, QR code etc.) using a camera of the user device connected to the device processor 208*a*. In still other cases, the user's seat location can be captured using, for example, GPS coordinate data from a GPS located on the user device 202.

In some cases, the user application 208*g* may also request from the user information in respect of the type of media they would like to capture (i.e., a photograph, image burst or short video clip).

Referring back to FIG. 8A, at act 804*a*, the user device 202 may transmit the media capture request to the server 204.

At act 806*a*, in some embodiments, the user device 202 may receive back an indication of the user's place in a waiting queue to access a specific venue camera. The indication may be presented to the user by the user application 208*g* via the device display 208*d*. For example, FIG. 10E shows an interface 1000*e*, where the user may observe the number of people ahead of him in the queue (i.e., 1002*e*). In some cases, the user may also receive a live media feed 1004*e* of what the users, currently being served, are observing on their respective user devices. For example, the media streaming module 210*j* can stream to each user device 202 in the queue the same stream view being observed by the user device 202 currently being served. This, in turn, can act as an educative tool to allow the queue users to understand how the application is being used by others to capture media.

Figure 10G:
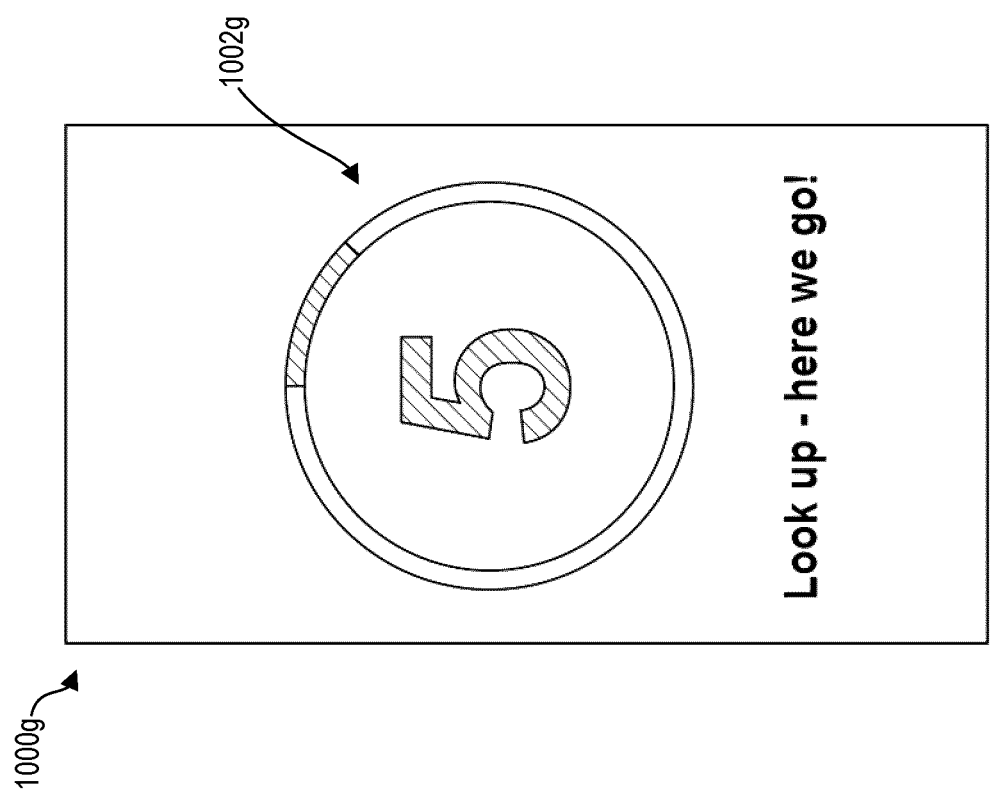
Figure 10I:
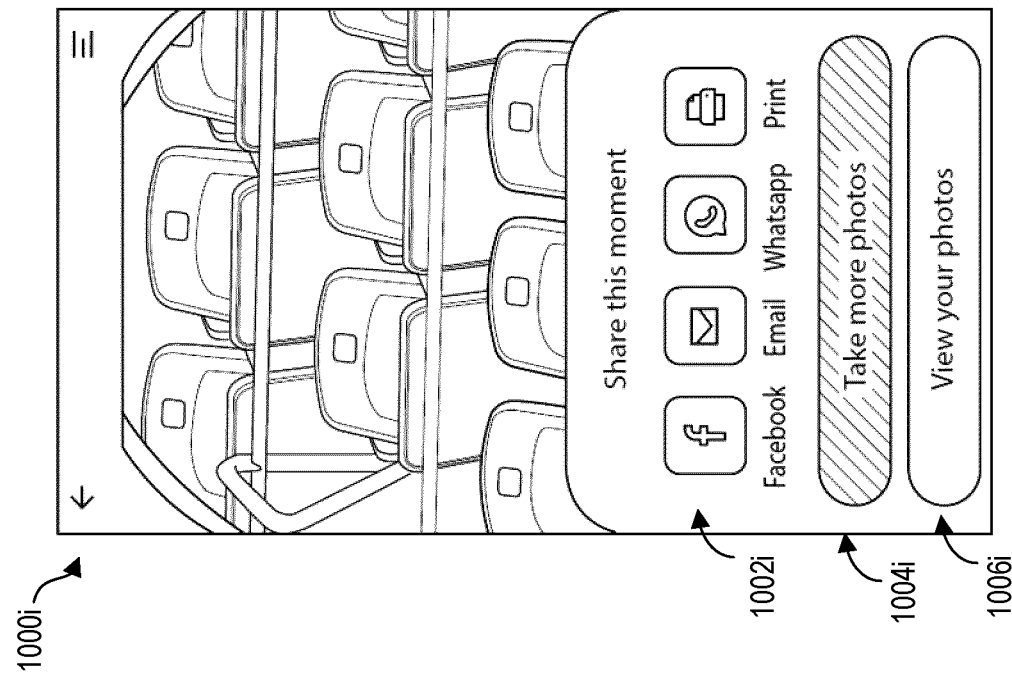
Figure 10H:
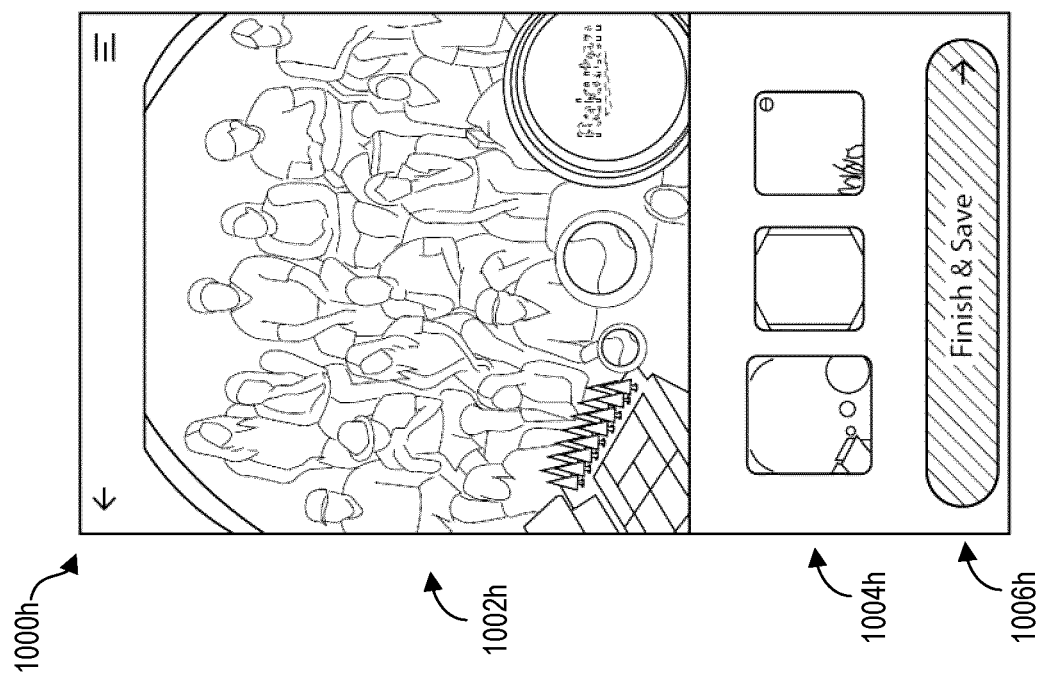

At act 808*a*, once the user is at the front of the queue (or if no queue is otherwise present), the camera may capture a media of the target location included in the media capture request. In some cases, as shown in the graphical frame 1000*f* of FIG. 10G, the user device 202 may display a countdown timer 1002*g* to provide the user with sufficient time to adjust their pose prior to the camera capturing the media. The captured media may then be transmitted, via the server 204, to the user application 208*g* associated with the requesting user device 202. FIG. 10H shows an example graphical interface 1000*h* for displaying a capture photograph 1002*h* that may be displayed on a user device 202. As shown, the user may have an option to add one or more filter overlays 1004*h*. In some cases, the user may also have the option of effecting some filter operations to the media (e.g., adjust colors, etc.). Once the user is satisfied with the media 1002*g*, the user may click "Finish & Save" 1006*g*. FIG. 10I shows another example graphical interface 1000*i* that may allow the user to download the media on their user device 202, or otherwise share their media 1002*i* with their social network. In still other cases, the user may print the media or otherwise send the media via e-mail. Options to "Take more photos" 1002*i* or view previously captured photos 1006*i* are also provided.

In other cases, rather than transmitting the media to the user device 2020, the media may be also stored on the server memory 210*b* and may be remotely accessed by the user device 202.

Figure 8B:
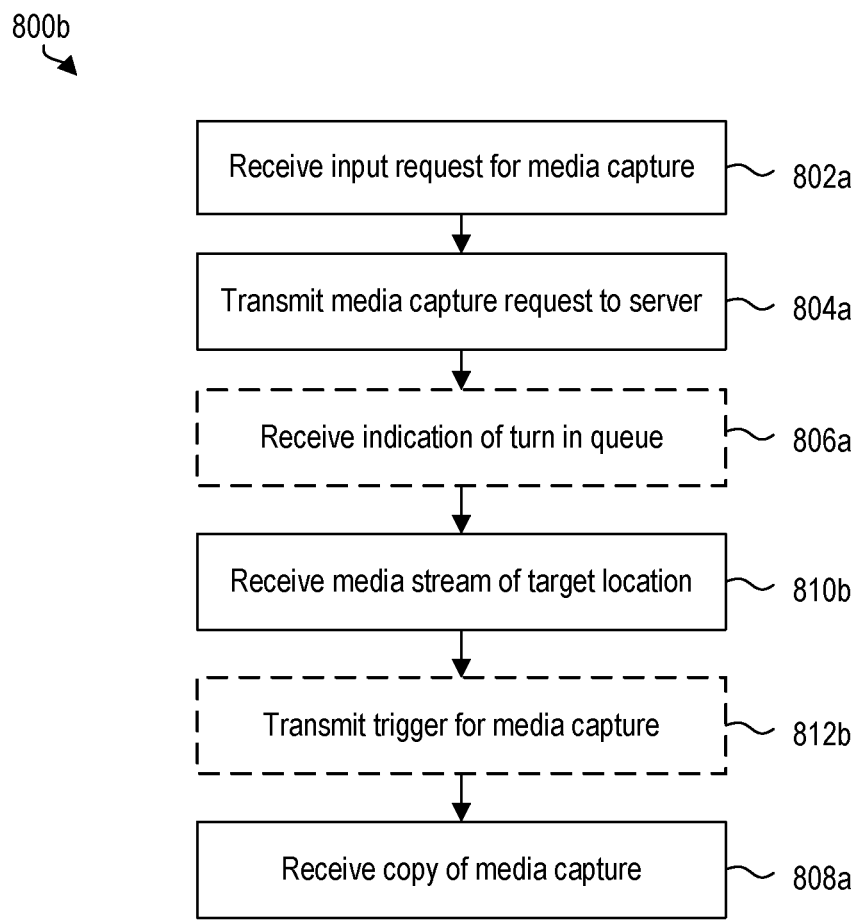
FIG. 8B is another example embodiment of a method for requesting a media capture using a user device.

Reference is now made to FIG. 8B, which shows another example embodiment of a method 800*b* for requesting a media capture using a user device. The method 800*b* can be performed, for example, using the device processor 208*a* executing the user application 208*g*. Method 800*b* is generally analogous to method 800*a*, but allows the user to view a media stream (i.e., a real-time or near real-time media stream) generated by the camera 105 aimed at the target location. In this manner, a user may—for example—observe their pose prior to media being captured of their location. Method 800*b* may complement method 700*d*, but from the user device 202 perspective.

At shown, at act 810*b*, once the camera is directed to the target location (i.e., the user's seat) the user application 208*g* can receive, from the server 210, a media stream that shows the camera's view of the target location.

At act 812*b*, once the user is satisfied with the camera view, the user may transmit a media capture trigger to capture media of the target location. For example, FIG. 10F shows an example graphical interface 1000*f* showing a live media stream 1002*f* from the camera. In this case, the user can click the "capture" button 1006*e*, to transmit a media capture trigger to the server 204. In other cases, as shown in FIG. 10E, a countdown timer 1002*e* may be simply displayed to the user, indicating the time remaining before the camera will automatically capture the media.

At act 808*a*, the user device 202 can receive a copy of the captured media.

Figure 8C:
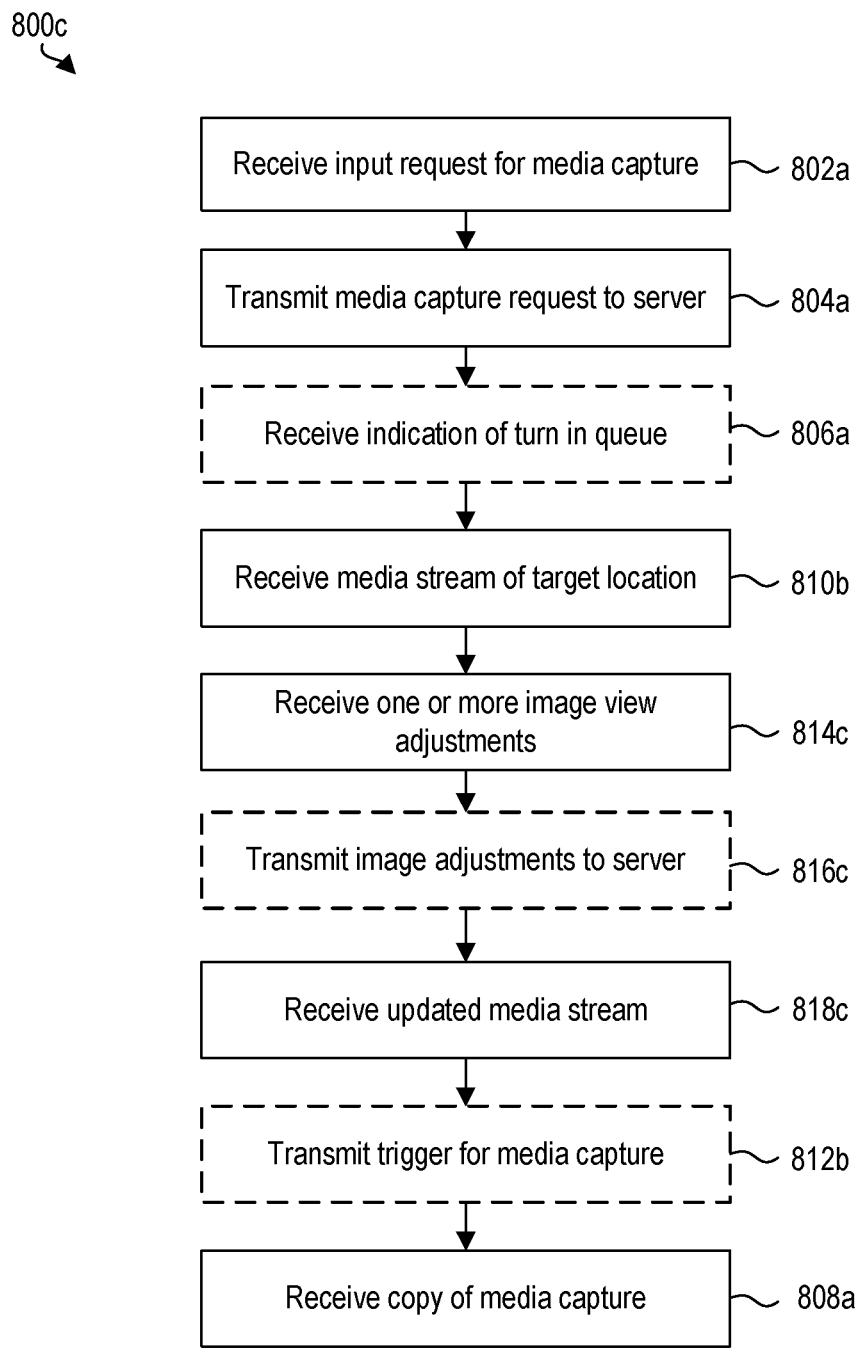
FIG. 8C is still another example embodiment of a method for requesting a media capture using a user device.

Reference is now made to FIG. 8C, which shows another example embodiment of a method 800*c* for requesting a media capture using a user device. The method 800*c* can be performed, for example, using the device processor 208*a* executing the user application 208*g*. Method 800*c* is generally analogous to the method 800*b*, but allows users to make one or more image view adjustments to the media stream received at act 810*b*. In this manner, the user can better calibrate the media capture view of the camera. Method 800*c* may complement method 700*e*, but from the user device 202 perspective.

At act 814*c*, once the user device 202 receives the media stream, the user device 202 can receive one or more inputs to adjust the image view. For example, as shown in FIG. 10F, the user may swipe slightly left or right to adjust the pan. Otherwise, the user may swipe up or down to adjust the camera tilt. In other cases, the user can zoom in our zoom out of the image. Accordingly, in some embodiments, at act 814*c*, the image adjustments can be transmitted to the server 204 which, in turn, can adjust the camera motor position.

In other cases, as shown in FIG. 9, to give the user of a user device 202 the appearance of real-time camera control—the user application program 204*g* may only display to the user a portion of the actual image frame received from the server 204 (i.e., by cropping the image). For example, FIG. 9A shows an image frame (i.e., as part of a media stream) that is transmitted to the user device 202. The target location (i.e., corresponding to the user's seat) is identified at 902*a*. As shown, the user is only able to view the viewable portion of the image frame as denoted by image portion 902*b*. For example, where the actual dimensions of the streamed image 900*a* have a width (W)×height (H), the viewable portion 902*b* may have dimensions of W/1.5×H/1.5. As shown in FIG. 9B, if the user desires to modify the pan 902*c*, the user application 204*g* may simply shift the viewable portion 902*b* to the right. Similarly, if the user desires to modify the zoom 902*d*, the user application 208*g* can simply increase the area of the viewable portion 902*b*. In various cases, the width and height of the viewable portion 902*b* may vary in accordance with equations (2) and (3):

$$\text{Visible View Width} = \frac{\text{Width of Streamed Image Frame }(W)}{\text{Zoom Multiplier }(X)} \quad (2)$$

$$\text{Visible View Height} = \frac{\text{Height of Streamed Image Frame }(H)}{\text{Zoom Multiplier }(X)} \quad (3)$$

wherein the "X" may be in a range of 1 to 2.

In this manner, it may not always be necessary to transmit instructions to the server 204 to alter the camera position each time the user desires to modify the image view. Rather, the user is provided with the illusion of instant latent-free real-time feedback when the user application 204*g* shifts the location and size of the viewable portion 902*b*.

In some embodiments, once the user alters the viewable portion 902*b*, an indication is transmitted of this alteration to the server 204. This can allow the media processing module 210*k* to apply the corresponding image crop to the captured media, prior to transmitting to the user device 202.

In some embodiments, in cases where a view cam (FIG. 10E) is being streamed to other users in the queue, the server 204 can also use the received indication to effect the same alteration to the viewable portion 902*b* to other users in the queue. In this manner, the other queue users may observe what the user being served is observing on their user device 202.

In other embodiments, the cropping of the image to generate the viewable portion 902*b* may be performed directly by on the server 204. For example, prior to transmitting the media stream by the media streaming module 210*j*, the media processing module 210*k* can process each image frame in the transmitted media stream to generate the viewable portion 902*b*. The media processing module 210*k* can then receive, from the user device 202, instructions to modify the position of the viewable portion. In turn, the a modified media stream is transmitted to the user device 202 with a modified location for the viewable portion 902*b*.

In some cases, in response to receive image view adjustments, the user application 204*g* may initially determine whether the user's requested image view adjustment is within the total received image frame range (i.e., 900*a*-900*c*). If so, the user application 204*g* may simply adjust the location and size of the viewable portion 902*b*. Otherwise, the user application 204*g* may transmit a request to the server 204 to re-orient the camera position. In other cases, this logic flow may occur directly on the server 204.

Returning to FIG. 8C, at act 816*c*, an updated media stream is received. For example, the updated media stream may be received from the server 204. Otherwise, the updated media stream may be generated by the user application 204*g* by modifying the viewable portion of each given image frame in a media stream.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description.

Various embodiments in accordance with the teachings herein are described to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which it is to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

The invention claimed is:

1. A method for automated control of cameras in a venue setting, the method comprising:

receiving a media capture request, wherein the media capture request comprises a request to capture a media of a target location in the venue;

assigning a camera located in the venue to capture the media;

accessing a camera-specific venue map associated with the assigned camera, wherein the camera-specific map comprises a mapping of one or more spatial regions in the venue to a corresponding one or more camera motor coordinates;

identifying a spatial region, of the one or more spatial regions, that includes the target location;

controlling the camera to aim at the target location based on the one or more camera motor coordinates associated with the spatial region; and controlling the camera to capture the media of the target location, wherein the camera is a pan, tilt camera, and each of the one or more camera motor coordinates associated with each spatial region, comprises pan, tilt and rotation motor coordinates to aim the camera at the spatial region; and controlling the camera to aim at the target location comprises:

determining the position of the target location within the spatial region, identifying the pan and tilt motor coordinates for each corner of a quadrilateral defining the spatial region, and determining pan and till coordinates for aiming the camera at the target location by interpolating between the pan and tilt motor coordinates for each corner of the spatial region based on the determined position of the target location within the spatial region.

2. The method of claim 1, wherein the method is performed by a server processor of a server, wherein the server is in communication with each of a user device and the camera via a communication network, and the media capture request is received from a user device.

3. The method of claim 2, wherein after aiming the camera at the target location, the method further comprises:

transmitting a real-time media stream from the camera to the user device, via the server.

4. The method of claim 3, further comprising dynamically adjusting the number of frames per second and the quality factor of each frame, in the real-time media stream, to minimize latency.

5. The method of claim 3, wherein the method further comprises:

receiving, from the user device, one or more commands for one or more camera adjustment operations;

controlling the camera according to the one or more camera adjustments operations; and transmitting an adjusted real-time media stream from the camera to the user device, via the server.

6. The method of claim 3, further comprising:

receiving, from the user device, a media capture trigger; and in response to the media capture trigger, controlling the camera to capture the media of the target location.

7. The method of claim 1, wherein the media comprises one or more of an image, a burst of images and a digital video clip.

8. The method of claim 1, wherein each spatial region, defined in the camera-specific venue map, comprises a quadrilateral shaped area, and the one or more camera motor coordinates associated with each spatial region comprise pan and tilt coordinates for each corner of the quadrilateral.

9. The method of claim 8, wherein the camera is a pan-tilt-zoom (PTZ) camera, and the camera-specific venue map includes a zoom value associated with each spatial region, the zoom value defining a degree of zoom for the camera when the spatial region is within the camera's field of view.

10. The method of claim 1, wherein the venue includes a plurality of cameras, each camera having a corresponding camera-specific venue map, and selecting the camera to capture the media comprises:

determining a mapped spatial region range of each camera-specific venue map; and selecting a camera having a mapped spatial region range that includes the target location.

11. The method of claim 10, wherein assigning the camera to capture the media comprises:

identifying at least two cameras having a mapped spatial region that includes the target location;

determining a request queue for each of the at least two cameras;

selecting the camera having the shortest request queue; and assigning the media capture request to the selected camera queue.

12. The method of claim 1, initially comprising generating the camera-specific venue map by:

defining a plurality of spatial regions, each spatial region defining an area in the venue;

identifying a reference object within the spatial region range;

capturing camera motor coordinates for each corner of the spatial region and relative to the reference object.

13. The method of claim 1, wherein the venue setting is one of a sports venue, a stadium, a mini-golf course, a bowling alley, a theater and a top golf course, and the target venue location is one of a seat number, a box number, a bowling alley lane number and a golf course hole number.

14. A system for automated control of cameras in a venue setting, the system comprising:

a user device;

at least one camera located in the venue;

a server, the server comprising one or more server processors configured to:

receive, from the user device, a media capture request, wherein the media capture request comprises a request to capture a media of a target location in the venue;

assign a camera, from the at least one camera, to capture the media;

access a camera-specific venue map associated with the selected camera, wherein the camera-specific map comprises a mapping of one or more spatial regions in the venue to a corresponding one or more camera motor coordinates;

identify a spatial region, of the one or more spatial regions, that includes the target location;

control the camera to aim at the target location based on the one or more camera motor coordinates associated with the spatial region; and control the camera to capture the media of the target location, wherein the camera is a pan, tilt camera, and each of the one or more camera motor coordinates, associated with each spatial region comprises pan, tilt and rotation motor coordinates to aim the camera at the spatial region; and controlling the camera to aim at the target location comprises the one or more server processors being configured to:

determine the position of the target location within the spatial region;

identify the pan and tilt motor coordinates for each corner of a quadrilateral defining the spatial region; and determine pan and tilt coordinates for aiming the camera at the target location by interpolating between the pan and tilt motor coordinates for each corner of the spatial region based on the determined position of the target location within the spatial region.

15. The system of claim 14, wherein the system comprises a communication network, and the server is in communication with each of a user device and the camera via the communication network.

16. The system of claim 15, wherein after aiming the camera at the target location, the one or more server processors are configured to:

transmit a real-time media stream from the camera to the user device, via the server.

17. The system of claim 16, wherein the one or more server processors are further configured to dynamically adjust the number of frames per second and the quality factor of each frame, in the real-time media stream, to minimize latency.

18. The system of claim 17, wherein the one or more server processors are further configured to:

receive, from the user device, one or more commands for one or more camera adjustment operations;

control the camera according to the one or more camera adjustments operations; and transmit an adjusted real-time media stream from the camera to the user device, via the server.

19. The system of claim 17, wherein the one or more server processors are further configured to:

receive, from the user device, a media capture trigger; and in response to the media capture trigger, control the camera to capture the media of the target location.

20. The system of claim 14, wherein the media comprises one or more of an image, a burst of images and a digital video clip.

21. The system of claim 14, wherein each spatial region, defined in the camera-specific venue map, comprises a quadrilateral shaped area, and the one or more camera motor coordinates associated with each spatial region comprise pan and tilt coordinates for each corner of the quadrilateral.

22. The system of claim 21, wherein the camera is a pan-tilt-zoom (PTZ) camera, and the camera-specific venue map includes a zoom value associated with each spatial region, the zoom value defining a degree of zoom for the camera when the spatial region is within the camera's field of view.

23. The system of claim 14, wherein the venue includes a plurality of cameras, each camera having a corresponding camera-specific venue map, and selecting the camera to capture the media comprises the one or more server processors being further configured to:

determine a mapped spatial region range of each camera-specific venue map; and select a camera having a mapped spatial region range that includes the target location.

24. The system of claim 23, wherein assigning the camera to capture the media comprises the one or more server processors being configured to:

identify at least two cameras having a mapped spatial region that includes the target location;

determine a request queue for each of the at least two cameras;

select the camera having the shortest request queue; and assign the media capture request to the selected camera queue.

25. The system of claim 14, wherein the one or more server processors being further configured to initially generate the camera-specific venue map by:

defining a plurality of spatial regions, each spatial region defining an area in the venue;

identifying a reference object within the spatial region range;

capturing camera motor coordinates for each corner of the spatial region and relative to the reference object.

26. The system of claim 14, wherein, the venue setting is one of a sports venue, a stadium, a mini-golf course, a bowling alley, a theater and a top golf course, and the target venue location is one of a seat number, a box number, a bowling alley lane number and a golf course hole number.

* * * * *

UNITED STATES PATENT AND TRADEMARK OFFICE
CERTIFICATE OF CORRECTION

| | |
|---|---|
| PATENT NO. | : 12,464,231 B2 |
| APPLICATION NO. | : 18/553388 |
| DATED | : November 4, 2025 |
| INVENTOR(S) | : Sami Dalati and Sepehr Hadizadehmoghaddam |

Page 1 of 1

It is certified that error appears in the above-identified patent and that said Letters Patent is hereby corrected as shown below:

In the Claims

Claim 1, Column 35, Line 30:
"determining pan and till coordinates"
Should read:
-- determining pan and tilt coordinates --

Signed and Sealed this
Sixteenth Day of December, 2025

John A. Squires
*Director of the United States Patent and Trademark Office*